(12) United States Patent
Nojima et al.

(10) Patent No.: US 8,419,090 B2
(45) Date of Patent: Apr. 16, 2013

(54) VEHICULAR METAL ABSORBER, VEHICULAR BUMPER SYSTEM, AUTOMOBILE BUMPER ABSORBER, AND AUTOMOBILE BUMPER SYSTEM

(75) Inventors: Koji Nojima, Fuji (JP); Isao Satsukawa, Fuji (JP); Takashi Ariga, Tokyo (JP); Akihiro Uenishi, Tokyo (JP); Toshiyuki Niwa, Tokyo (JP)

(73) Assignees: Unipres Corporation, Kanagawa (JP); Nippon Steel & Sumitomo Metal Corporation, Tokyo (JP)

( * ) Notice: Subject to any disclaimer, the term of this patent is extended or adjusted under 35 U.S.C. 154(b) by 60 days.

(21) Appl. No.: 12/450,454

(22) PCT Filed: Mar. 28, 2008

(86) PCT No.: PCT/JP2008/056740
§ 371 (c)(1),
(2), (4) Date: Sep. 25, 2009

(87) PCT Pub. No.: WO2008/117896
PCT Pub. Date: Oct. 2, 2008

(65) Prior Publication Data
US 2010/0066106 A1  Mar. 18, 2010

(30) Foreign Application Priority Data

Mar. 28, 2007 (JP) ................................. 2007-084128
Mar. 25, 2008 (JP) ................................. 2008-077278

(51) Int. Cl.
*B60R 19/02* (2006.01)
*B60R 19/04* (2006.01)
*B60R 19/18* (2006.01)
*B60R 19/56* (2006.01)

(52) U.S. Cl.
USPC ............................ 293/120; 296/102; 296/133

(58) Field of Classification Search .................. 293/120, 293/121, 155, 109, 110, 113, 102; 296/187.03, 296/187.04, 187.09; 188/371, 277
See application file for complete search history.

(56) References Cited

U.S. PATENT DOCUMENTS

| 6,371,540 B1 * | 4/2002 | Campanella et al. ......... 293/102 |
| 6,416,094 B1 * | 7/2002 | Cherry .......................... 293/120 |

(Continued)

FOREIGN PATENT DOCUMENTS

| JP | 07-205732 | 8/1995 |
| JP | 10-175020 | 6/1998 |

(Continued)

OTHER PUBLICATIONS

Supplementary European Search Report dated Jun. 4, 2010 issued in corresponding European Application No. EP 08 73 9847.

(Continued)

*Primary Examiner* — Glenn Dayoan
*Assistant Examiner* — Sunsurraye Westbrook
(74) *Attorney, Agent, or Firm* — Kenyon & Kenyon LLP

(57) ABSTRACT

A vehicular metal absorber for efficiently absorbing by a short stroke the impact energy received from legs of a pedestrian at the time of a collision between a pedestrian and an automobile, reducing the residual crush, and protecting the legs of the pedestrian, that is, a long vehicular metal absorber comprising a center flange, a top web and bottom web connected to the two sides of the center flange, a top flange connected to the top web, and a bottom flange connected to the bottom web and formed overall into a hat shaped cross-section, wherein an internal angle $\alpha_1$ formed by the top web with a flange plane including the top flange and bottom flange and an internal angle $\alpha_2$ formed by the bottom web with the flange plane are respectively over 0 degree to less than 90 degrees, and in that one or both of the top web and bottom web are provided with a recessed or projecting bead substantially parallel to a front-back direction of a vehicle.

20 Claims, 17 Drawing Sheets

U.S. PATENT DOCUMENTS

| | | | |
|---|---|---|---|
| 6,510,771 B2 * | 1/2003 | Sturrus et al. | 83/54 |
| 6,877,785 B2 * | 4/2005 | Evans et al. | 293/120 |
| 6,997,490 B2 * | 2/2006 | Evans et al. | 293/120 |
| 2005/0248164 A1 | 11/2005 | Kimura et al. | |
| 2007/0024069 A1 * | 2/2007 | Takagi et al. | 293/102 |

FOREIGN PATENT DOCUMENTS

| | | |
|---|---|---|
| JP | 2006-232042 | 9/2002 |
| JP | 2003-503272 | 1/2003 |
| JP | 2004-232042 | 8/2004 |
| JP | 2004-322861 | 11/2004 |
| JP | 2005-178695 | 7/2005 |
| JP | 2005-534555 | 11/2005 |
| JP | 2005-536392 | 12/2005 |
| JP | 2006-23204 | 9/2006 |
| KR | 1998-68371 | 12/1998 |
| WO | WO 98/11267 | 3/1998 |
| WO | WO 01/02218 | 1/2001 |
| WO | WO 2004/011306 | 2/2004 |
| WO | WO2004018261 | 3/2004 |

OTHER PUBLICATIONS

International Search Report dated May 27, 2008 issued in corresponding PCT Application No. PCT/JP2008/056740.

Japanese Office Action dated Jan. 20, 2009 issued in corresponding Japanese Application No. 2008-077278.

European Enhanced Vehicle-safety Committee, "Improved Test Methods to Evaluate Pedestrian Protection Afforded by Passenger Cars", EEVC Working Group 17 Report, Dec. 1998.

Office Action issued on Mar. 2, 2011 in the corresponding Korean Application No. 1998-68371.

* cited by examiner (d)

(c)

(a)    (b)

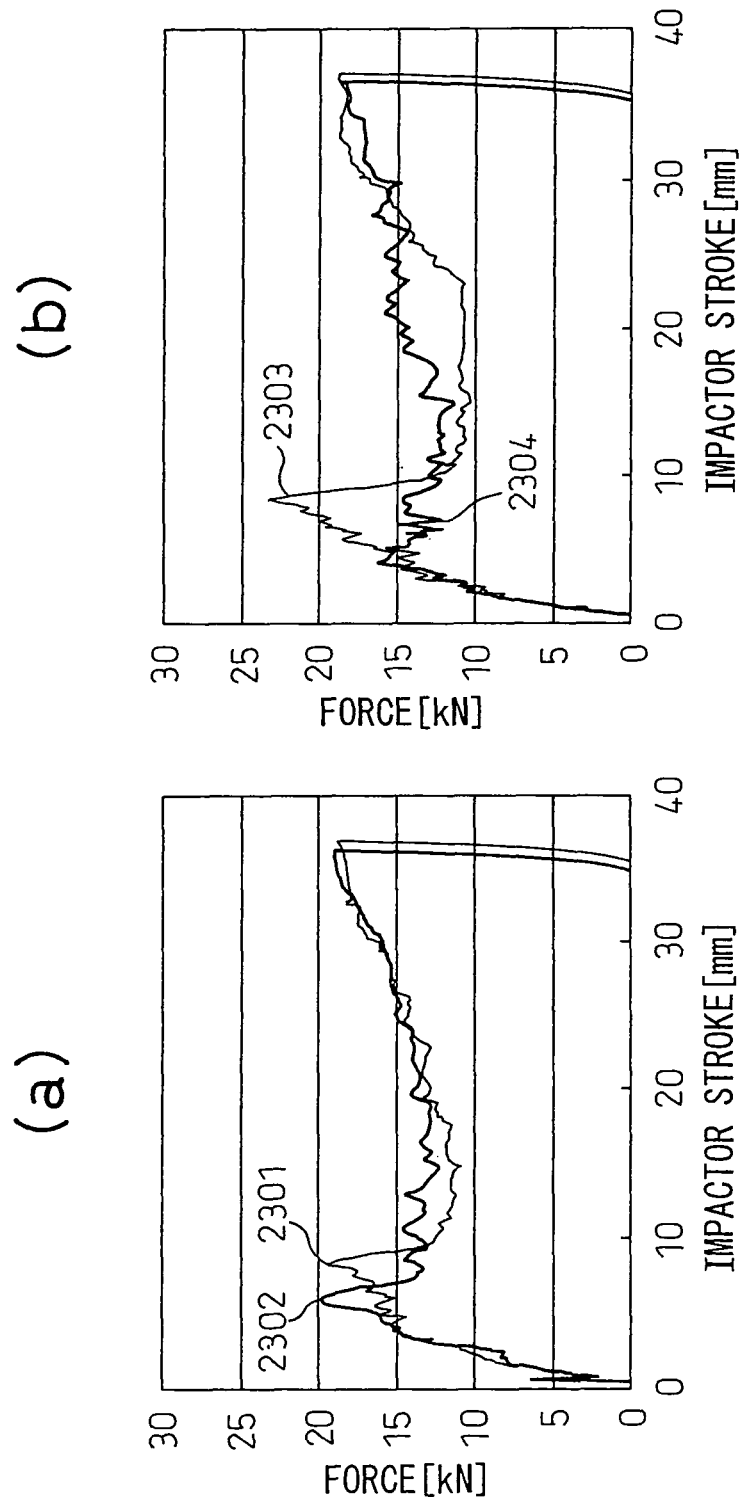

VEHICULAR METAL ABSORBER, VEHICULAR BUMPER SYSTEM, AUTOMOBILE BUMPER ABSORBER, AND AUTOMOBILE BUMPER SYSTEM

This application is a national stage application of International Application No. PCT/JP2008/056740, filed 28 Mar. 2008, which claims priority to Japanese Application Nos. 2007-084128, filed 28 Mar. 2007; and 2008-077278, filed 25 Mar. 2008, each of which is incorporated by reference in its entirety.

TECHNICAL FIELD

The present invention relates to bumper parts absorbing impact energy generated at the time of a collision between an automobile or other vehicle and a pedestrian and contributing to the protection of the legs of the pedestrian.

BACKGROUND ART

At the present, in the laws of various countries and regions and in the NCAP (New Car Assessment Program), collision of automobiles is being regulated and assessed. Among these, in recent years, in addition to the protection of the heads of pedestrians, studies have been advanced regarding protection of the legs (see "European Enhanced Vehicle-safety Committee, Improved Test Methods to Evaluate Pedestrian Protection Afforded by Passenger Cars", EEVC Working Group 17 Report, December 1998 etc.) Demand is rising for protection of the legs at the time of a collision between a pedestrian and an automobile.

In automobiles up until now, attempts have been made to design bumpers with impact resistance predicated on collision with other objects or other vehicles. However, when such a designed automobile collides with a pedestrian, there is a good chance of causing residual disability to the knee tendons and shin bones of the pedestrian's legs. For this reason, design of bumpers for reducing such problems is being sought.

As a measure for solving this, provision of a plastic absorber between the bumper fascia and reinforcement to absorb the impact energy generated at the time of collision with a pedestrian is disclosed in Japanese Patent Publication (A) No. 2004-322861 (Document 1).

Further, regarding a metal hat-shaped cross-sectional shape, as a vehicular collision reinforcement (bumper reinforcement), to prevent the web from buckling, a shape making the thickness of the web greater than the flange thickness of the center is disclosed in Japanese Patent Publication (A) No. 2005-178695 (Document 2).

Furthermore, in an automobile bumper beam, for the purpose of increasing the amount of energy absorbed at the time of a frontal collision, a structure provided with a front base sheet and a rear base sheet made of a metal material, two metal cores arranged vertically between these, and an energy absorber made of a metal material, the two cores provided with continuous projections and recesses extending in the front-back direction of the chassis, is described in Japanese Patent Publication (A) No. 2003-503272 (Document 3).

For an absorber provided between a fascia and a bumper beam and believed to be plastic, an energy absorber (absorber) having an upper horizontal part and lower horizontal part provided with continuous projections and recesses extending in the front-back direction of the chassis and an intermediate horizontal part connecting these, the upper horizontal part and lower horizontal part having an upper front nose part and lower front nose part extending out to the front of the intermediate horizontal part, is described in Japanese Patent Publication (A) No. 2005-534555 (Document 4).

Further, a plastic pedestrian-use energy absorber having, as one type of the projections, a plurality of collapsible lobes each comprised of a front lobe part with a small cross-sectional area and a rear lobe part with a large cross-sectional area in the front-back direction of the chassis and having a cross-sectional approximately hat shape is described in Japanese Patent Publication (A) No. 2005-536392 (Document 5).

Further, in a bent sheet used as a roofing material, a roll former forming a metal strip into a hat-shaped cross-sectional shape and producing a member having wave shapes of alternately repeating recesses and projections along the width direction along the longitudinal direction of the member is described in Japanese Patent Publication (A) No. 10-175020 (Document 6).

Further, a front structure of a vehicle comprised of a flared top energy absorber not having projections and recesses in the front-back direction of the chassis, but having bent parts in the middle of the front-back direction of the chassis and produced by press-forming a steel sheet and a bottom energy absorber with a front end part positioned to the rear from the top energy absorber is described in Japanese Patent Publication (A) No. 2006-232042 (Document 7).

However, for example, the plastic absorber disclosed in Document 1 requires a large amount of deformation and residual crush in absorbing the impact energy. For this reason, the plastic absorber body becomes larger, the dimensions between the bumper fascia and reinforcement become larger, and the minimum turning radius of the vehicle is increased. This is also not preferable in terms of aesthetic design. Further, the plastic absorber is one cause of a high material and production cost and deterioration of the cost of the vehicle as a whole.

Further, the bumper reinforcement disclosed in Document 2 strengthens the web so as to prevent web buckling and locally increase the absorbed energy at the time of collision, so from the viewpoint of pedestrian protection, conversely the pedestrian may be given greater injury, so this is not preferable.

Furthermore, the projections or recesses disclosed in Document 3 are shapes for enabling the sheet thicknesses of the two cores to be made thinner and simultaneously maintaining resistance to buckling (see Description, paragraph no. 0023). Again, from the viewpoint of pedestrian protection, conversely the pedestrian may be given greater injury, so this is not preferable.

Further, the invention disclosed in Document 4 absorbs relatively low energy by making either of the upper horizontal part or lower horizontal part move upward. However, the energy absorption by plastic deformation of a plastic, as explained later, is small at the initial period of deformation, so at the time of collision with a pedestrian at a speed of 40 km/hr, it is not possible to protect the pedestrian by a short stroke. The structure is also complicated, so there is the problem that this is not preferable in terms of aesthetic design.

Further, the invention disclosed in Document 5 is also a plastic, so in the same way as the invention disclosed in Document 4, when a pedestrian is collided with at a speed of 40 km/hr, there are the problems that the pedestrian cannot be protected by a short stroke and the impact energy cannot be absorbed by a small stroke.

Further, the invention disclosed in Document 6 has as its object to facilitate the plastic deformation of a roofing material to a curved state. Neither application of use for an automobile bumper absorber nor the problem of absorbing the impact energy received from the leg of a pedestrian is described.

Further, the invention disclosed in Document 7 is a complicated structure not having projections and recesses in the front-back direction of the chassis, but having a top energy absorber and bottom energy absorber, so has problems similar to Document 4.

DISCLOSURE OF THE INVENTION

The present invention has as its problem the provision of an automobile bumper absorber and automobile bumper system efficiently absorbing the impact energy received from a leg of a pedestrian by a short stroke and reducing residual crush to thereby protect the leg of the pedestrian at the time of a collision between a pedestrian and an automobile.

The present invention was made to solve this problem and has as its gist the following.

(1) A long vehicular metal absorber comprising a center flange, a top web and bottom web connected to the two sides of the center flange, a top flange connected to the top web, and a bottom flange connected to the bottom web and formed overall into a hat shaped cross-section, the vehicular metal absorber characterized in that in the hat-shaped cross-section, an internal angle $\alpha_1$ formed by the top web with a flange plane including the top flange and bottom flange and an internal angle $\alpha_2$ formed by the bottom web with the flange plane are respectively over 0 degree to less than 90 degrees and in that one or both of the top web and bottom web are provided with a recessed or projecting bead substantially parallel to a front-back direction of a vehicle.

(2) A vehicular metal absorber as set forth in (1), characterized in that, furthermore, in the hat-shaped cross-section, a bent part is provided in the middle of one or both of the top web and bottom web, an internal angle $\beta_1$ formed by the bent part of the top web with the flange plane is over 0 degree to less than $\alpha_1$ degrees, and an internal angle $\beta_2$ formed by the bent part of the bottom web with the flange plane is over 0 degree to less than $\alpha_2$ degrees.

(3) A vehicular metal absorber as set forth in (1) or (2), characterized in that when a front-back direction dimension of the absorber is H mm, the bead has a width of H/5 to H/2.5 mm, a pitch of H/2.5 to H/1.25 mm, and a depth of H/50 to H/10 mm.

(4) A vehicular metal absorber as set forth in any one of (1) to (3), characterized in that when the pitch of the beads is L mm, the arrangements of the beads at the top and bottom surface are offset by L/4 to L/2 mm above and below.

(5) A vehicular metal absorber as set forth in (3) or (4), characterized in that, when the maximum width of the top web and bottom web is W mm, H/3≦W≦H/1.5 mm is satisfied.

(6) A vehicular metal absorber as set forth in any one of (1) to (5), characterized in that a tensile strength (MPa) and sheet thickness (mm) of the material are set in a range obtained by successively connecting by lines the points of $A_{TS}$ (0.2,1200), $B_{TS}$ (0.2,400), $C_{TS}$ (0.4,400), $D_{TS}$ (0.4,200), $E_{TS}$ (1.6,200), $F_{TS}$ (1.6,400), $G_{TS}$ (1.4,400), $H_{TS}$ (1.4,600), $I_{TS}$ (1.2,600), $J_{TS}$ (1.2,800), $K_{TS}$ (1.0,800), $L_{TS}$ (1.0,1000), $M_{TS}$ (0.6,1000), $N_{TS}$ (0.6,1200), and $A_{TS}$ (0.2,1200) of (x,y) coordinates in an x-y orthogonal coordinate system having the tensile strength as the y-axis and the sheet thickness as the x-axis.

(7) A vehicular metal absorber as set forth in any one of (1) to (5), characterized in that a yield strength (MPa) and sheet thickness (mm) of the material are set in a range obtained by successively connecting by lines the points of $A_{YS}$ (0.2,1000), $B_{YS}$ (0.2,300), $C_{YS}$ (0.4,300), $D_{YS}$ (0.4,150), $E_{YS}$ (1.6,150), $F_{YS}$ (1.6,300), $G_{YS}$ (1.4,300), $H_{YS}$ (1.4,400), $I_{YS}$ (1.2,400), $J_{YS}$ (1.2,600), $K_{YS}$ (1.0,600), $L_{YS}$ (1.0,800), $M_{YS}$ (0.6,800), $N_{YS}$ (0.6,1000), and $A_{YS}$ (0.2,1000) of (x,y) coordinates in an x-y orthogonal coordinate system having the yield strength as the y-axis and the sheet thickness as the x-axis.

(8) A vehicular metal absorber as set forth in any one of (1) to (7), characterized in that $\alpha_1=\alpha_2$.

(9) A vehicular metal absorber as set forth in any one of (2) to (8), characterized in that $\beta_1$ and $\beta_2$ respectively satisfy $\alpha_1-30<\beta_1<\alpha_1-5$ degrees and $\alpha_2-30<\beta_2<\alpha_2-5$ degrees.

(10) A vehicular metal absorber as set forth in any one of (2) to (9), characterized in that $\beta_1=\beta_2$.

(11) A vehicular metal absorber as set forth in any one of (2) to (10), characterized in that, furthermore, in the hat-shaped cross-section, one or both of the top web and bottom web have a plurality of bent parts, an internal angle $\beta_{1,n}$ formed by a bent part of the top web with the flange plane satisfies $0<\beta_{1,n}<\beta_{1,n-1}<\alpha_1$ degrees, and an internal angle $\beta_{2,n}$ of a bent part of the bottom web with the flange plane satisfies $0<\beta_{2,n}<\beta_{2,n-1}<\alpha_2$ degrees:

where, n=2, ..., N (N is an integer and is 1, 2 ... N in order from close to the top flange or bottom flange)

(12) A vehicular metal absorber as set forth in (11) characterized in that $\beta_{1,n}=\beta_{2,n}$.

(13) A vehicular metal absorber as set forth in any one of (2) to (12), characterized in that when a front-back direction dimension (H) of the absorber is made H mm, a bent part is provided in a region satisfying 0.3H to 0.7H mm in the vehicle front-back direction from the top flange or bottom flange.

(14) A vehicular metal absorber as set forth in any one of (1) to (13), characterized in being for automobile bumper use.

(15) A vehicular metal absorber as set forth in any one of (1) to (14), characterized in that when making an impactor of a diameter of 70 mm, a length of 200 mm, and a mass of 8 kg impact an absorber as set forth in any one of claims 1 to 14 by an initial speed of 40 km/hr, a maximum force acting on the impactor is 2 kN to 12 kN, a force acting on the impactor is substantially constant, and a front-back direction dimension of the absorber necessary until the impactor stops is 50 mm or less.

(16) A vehicular bumper system characterized by providing a fascia and reinforcement before and after a vehicular metal absorber as set forth in any one of (1) to (15).

(17) An automobile bumper absorber made of metal provided between a fascia and reinforcement of an automobile bumper, the absorber characterized by comprising a hat shape with a top and bottom surface flaring out toward the rear direction of the vehicle and by having a recessed or projecting bead substantially parallel to the front-back direction of the vehicle at the top and bottom surfaces.

(18) An automobile bumper absorber as set forth in (17), characterized in that a flaring angle of the top and bottom surfaces changes in the middle of the front-back direction of the vehicle and the top and bottom surfaces have peak parts.

(19) An automobile bumper absorber as set forth in (17) or (18), characterized in that when a front-back direction dimension of the absorber is H mm, the bead has a width of H/5 to H/2.5 mm, a pitch of H/2.5 to H/1.25 mm, and a depth of H/50 to H/10 mm.

(20) An automobile bumper absorber as set forth in any one of (17) to (19), characterized in that when the pitch of the bead is L mm, the arrangements of the beads at the top and bottom surface are offset by L/4 to L/2 mm above and below.

(21) An automobile bumper absorber as set forth in any one of (17) to (20), characterized in that a tensile strength and sheet thickness of the material satisfy the range of the solid line 18 of FIG. 12.

(22) An automobile bumper system characterized by providing a fascia and reinforcement before and after an automobile bumper absorber as set forth in any one of (17) to (21).

Further, in the present invention, "substantially parallel" means, when projecting the bead on a horizontal plane, the ridgeline of the bead is within a range of within ±10 degrees of the front-back direction of the chassis.

Further, the "force acting on the impactor is substantially constant" is defined as a width of fluctuation of the force acting on the impactor being not more than an average value±25% of the force from after the force acting on the impactor reaches the initial maximal value to right before the impactor stops.

Such a hat-shaped metal absorber of the present invention is crushed to become broader in the vertical direction at the time of a collision between a pedestrian and an automobile. Due to this, it becomes possible to efficiently absorb by a short stroke the impact energy received from the leg of a pedestrian and reduce the residual crush, so it becomes possible to protect the leg of a pedestrian by the smallest member dimension. Specifically, when colliding with a pedestrian at a speed of 40 km/hr, it becomes possible to absorb the impact energy by a stroke of 50 mm or less and protect the leg of the pedestrian.

Further, (b) is a view showing an absorber arranging beads of the top web and bottom web so that projecting beads and recessed beads face each other.

FIG. 23 are views for explaining the arrangement of the beads and the relationship of a force and stroke at the time of collision, in which (a) is a view showing the relationship of a force and stroke at the time of collision of an absorber arranging the beads of the top web and bottom web offset by half a wavelength so that projecting beads and recessed beads do not face each other.

Further, (b) is a view showing the relationship of a force and stroke at the time of collision of an absorber arranging the beads of the top web and bottom web so that projecting beads and recessed beads face each other.

BEST MODE FOR CARRYING OUT THE INVENTION

The aspects of the present invention of the above (1) to (22) will be successively explained next.

First, the aspect of the present invention according to (1) will be explained in detail.

Figure 1:
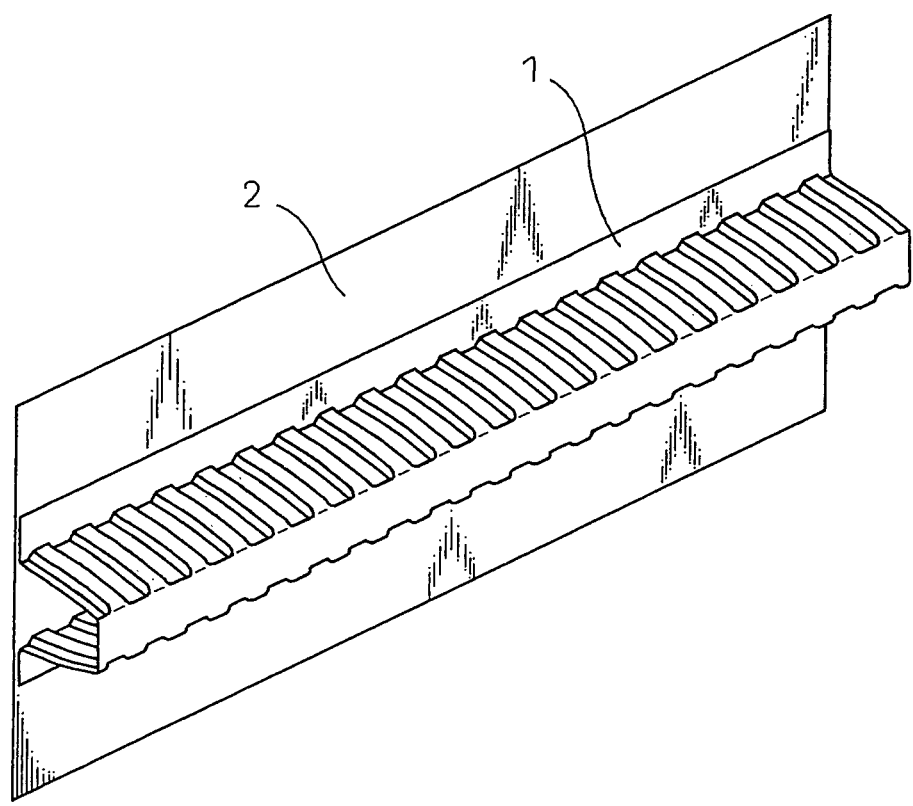
FIG. 1 is a schematic view of attachment of a metal absorber to a reinforcement.

The metal absorber according to the present invention may also be used along for a guard rail etc, but as shown by the outline when attaching a metal absorber 1 of the present invention to a reinforcement 2 in FIG. 1, one having a length of the chassis width direction and provided between a bumper fascia arranged at the front (not shown) and a reinforcement 2 arranged at the rear is preferable.

This metal absorber is an approximately hat shape formed by pressing steel sheet. Its opening part is provided flaring out toward the rear direction of the chassis.

Figure 2:
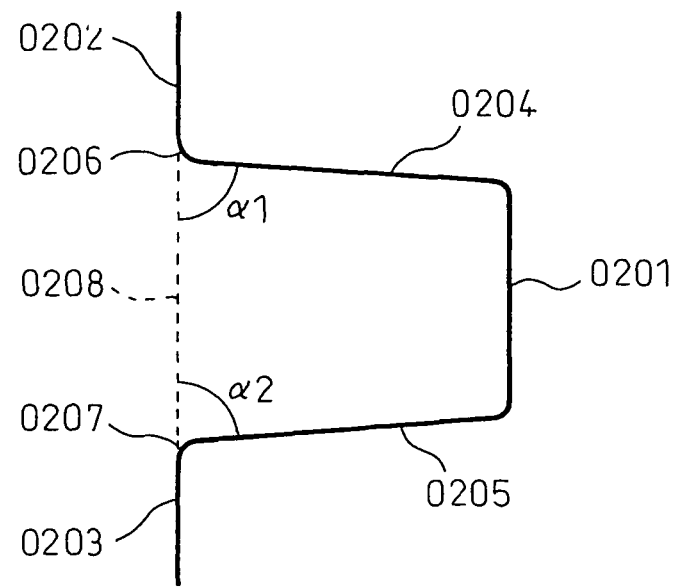
FIG. 2 is a cross-sectional view of a metal absorber of an invention example.

That is, the metal absorber according to the present invention, as shown in FIG. 2, comprises a center flange 0201, a top web 0204 and bottom web 0205 formed connected to its two ends, and a top flange 0202 and bottom flange 0203 respectively formed connected from the ends of the top web 0204 and bottom web 0205 at the opposite side to the center flange 0201. It is formed integrally from steel sheet.

Further, in the hat-shaped cross-section, an internal angle $\alpha_1$ formed by the top web 0204 with the flange plane 0208 including the top flange 0202 and bottom flange 0203 about an intersection 0206 of the top web 0204 and top flange 0202 and an internal angle $\alpha_2$ formed by the bottom web 0205 with the flange plane 0208 about an intersection 0207 of the bottom web 0205 and bottom flange 0203 are respectively made over 0 degree to less than 90 degrees.

To absorb the impact energy by the plastic deformation of the top web and bottom web, both $\alpha_1$ and $\alpha_2$ respectively must exceed 0 degree, preferably are at least 45 degrees, more preferably are at least 60 degrees. This is because if $\alpha_1$ and $\alpha_2$ are less than 45 degrees, the member cross-section will end up collapsing without the top web and the bottom web plastically deforming.

On the other hand, if $\alpha_1$ and $\alpha_2$ respectively become 90 degrees or more, when press forming the steel sheet, the projecting die tool and the recessed die tool will not be able to engage and formation will become impossible, so the angles are defined as less than 90 degrees, preferably are made 85 degrees or less.

Further, by making the absorber out of a metal, by making it flare out as explained above, and by providing one or both of the top web and bottom web with a recessed or projecting bead substantially parallel to the front-back direction of the vehicle, no matter what the position of the absorber a pedestrian is collided with, overall buckling easily occurs preferentially, so the impact energy can be absorbed without inflicting serious damage to the leg of the pedestrian.

Figure 3:
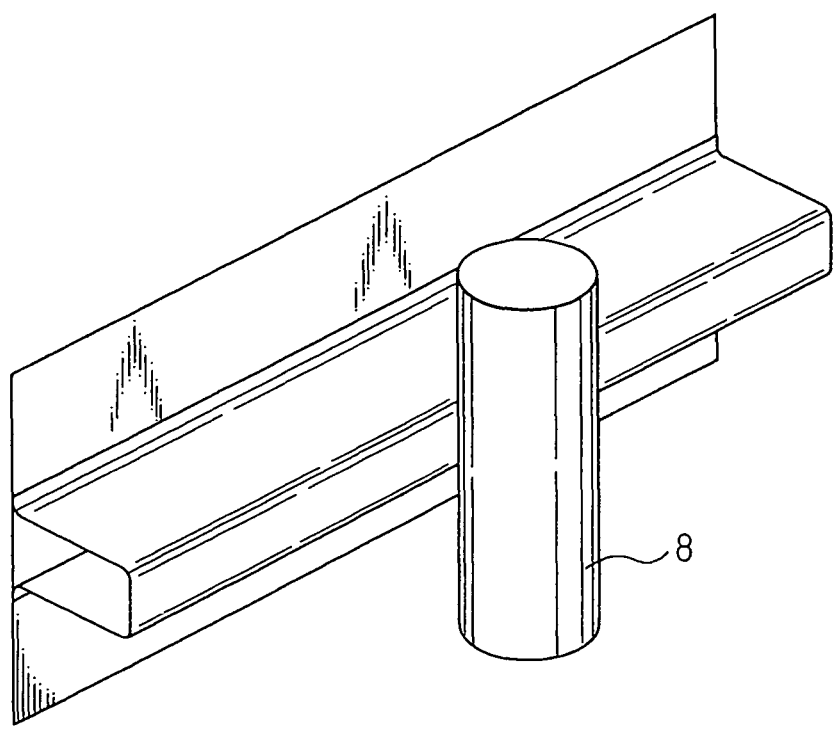
FIG. 3 is a view showing a collision test of a metal absorber of the prior art and a leg impactor.
Figure 4:
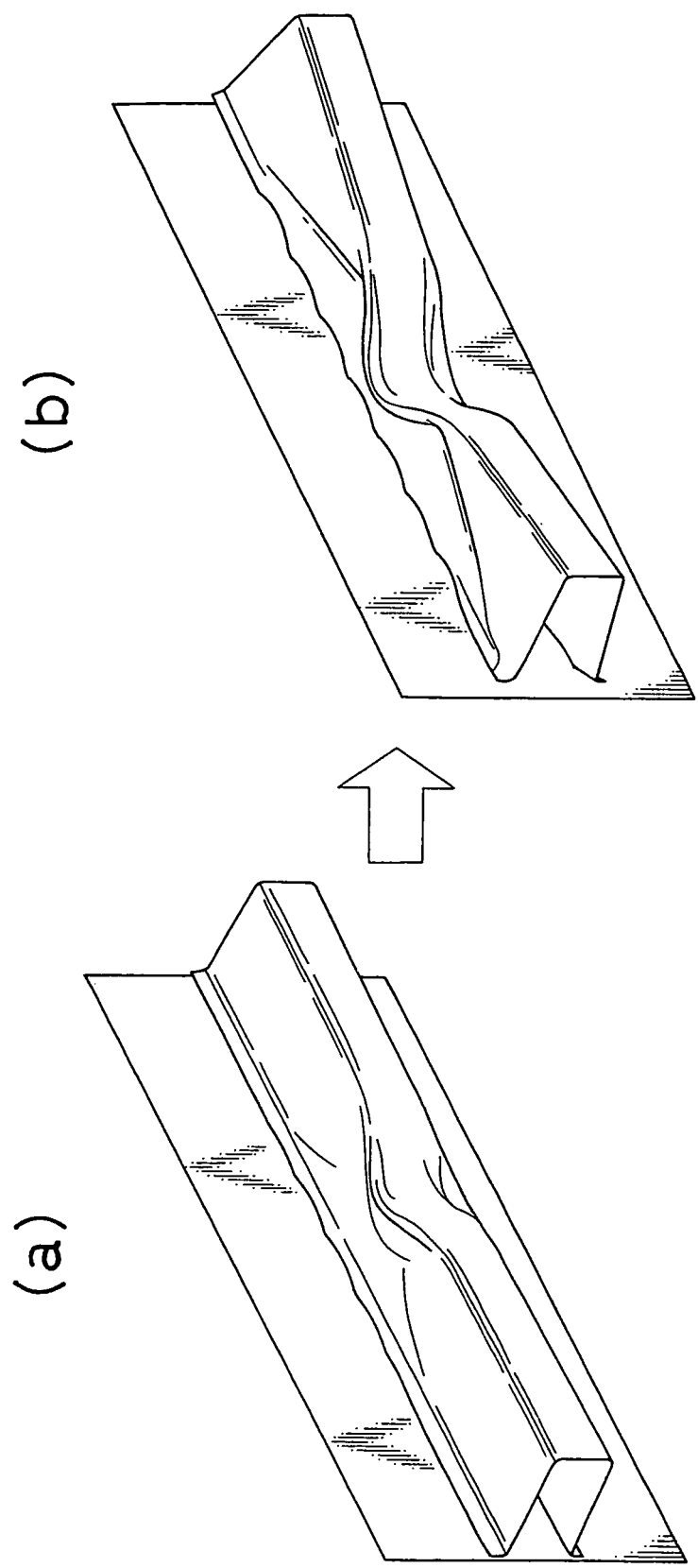
FIG. 4 are views showing deformation of a metal absorber of the prior art, in which (a) shows an initial period of collision and (b) shows an end period of collision.

As an example of the prior art, the mode of deformation of an absorber having a tensile strength of 300 MPa, a yield strength of 150 MPa, a sheet thickness of 1.0 mm, a vertical dimension of 40 mm, a front-back dimension of 80 mm, a left-right dimension of 500 mm, and a length (one side) of the top flange and bottom flange of 8 mm and having a rectangular cross-section web (see FIG. 3) when making an impactor having a diameter of 70 mm, a length of 200 mm, and a mass of 8 kg collide with it by an initial speed of 40 km/hr is shown in FIG. 4. Further, the stroke of the impactor and the force acting on the impactor are shown in FIG. 5.

Figure 5:
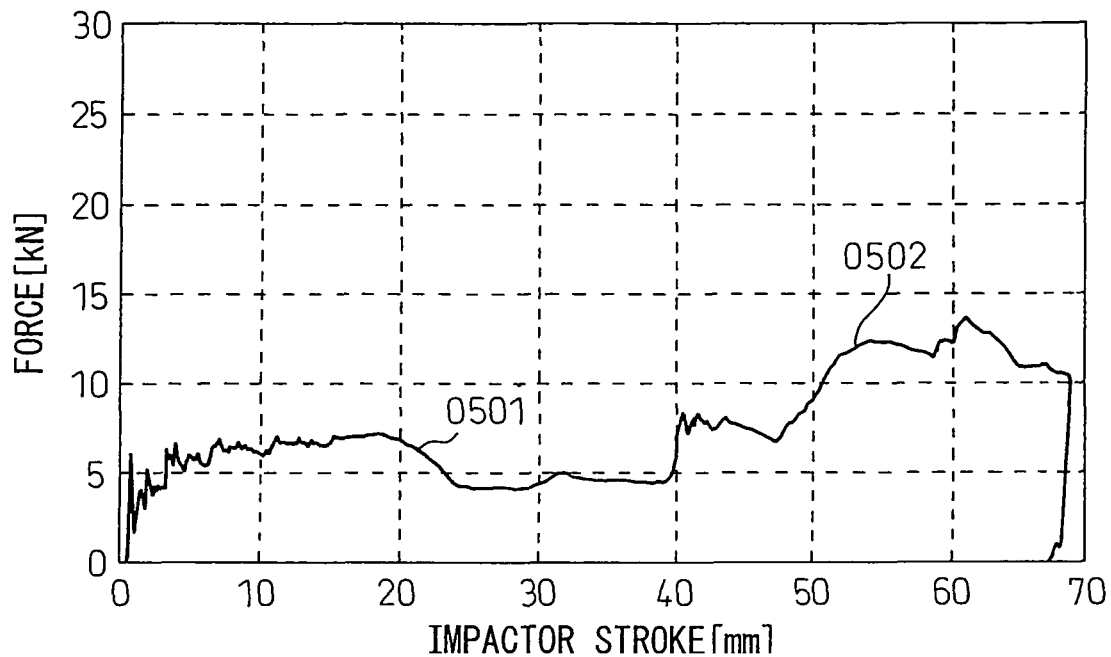
FIG. 5 is a view of the relationship between a force and stroke of a metal absorber of the prior art at the time of a collision.

As shown in FIG. 4(*a*), at the initial period of the collision, the member cross-section as a whole buckles right off (initial force large), the cross-section collapses, and the force rapidly drops (see FIG. 5, 0501). Further, as shown in FIG. 4(*b*), in the latter period of the collision, the cross-section folds inward, the residual crush is large, and the folded in top and bottom members strike each other, so too large a force is generated (see FIG. 5, 0502).

Therefore, a large stroke is required until finishing absorbing the energy. 50 mm does not enable the energy to be absorbed. On the other hand, if increasing the sheet thickness, the stroke can be reduced, but the weight of the member becomes greater, so the result is inferior to the present invention explained later.

Figure 6:
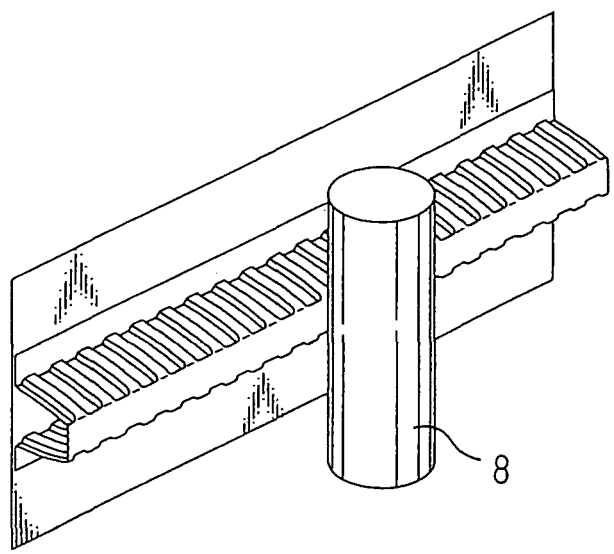
FIG. 6 is a view showing a collision test between an absorber of the present invention and a leg impactor.

As opposed to this, as shown in FIG. 6, an absorber having a top-bottom dimension of 45 mm, a front-back dimension of 50 mm, a left-right dimension of 500 mm, a length (one side) of the top flange and bottom flange of 20 mm, $\alpha_1=\alpha_2=85$ degrees, angles $\beta_1$ and $\beta_2$ of bent parts when forming bent parts by bending the top web and bottom web in the middle (see FIG. 11) of $\beta_1=\beta_2=77.5$ degrees, positions of bent parts of 25 mm in the front-back direction from the top flange and bottom flange, a bead shape of a bead width of 12.5 mm, a bead pitch (L) of 25 mm, and a bead depth of 3 mm, the beads of a bead arrangement arranged offset by 12.5 mm (L/2) at the top and bottom and a bead orientation of a ridgeline of the bead arranged ±2.9 degrees with respect to the front-back direction of the chassis when projected on the horizontal plane was tested by making an impactor collide with it under the same conditions as the above prior art.

Figure 7:
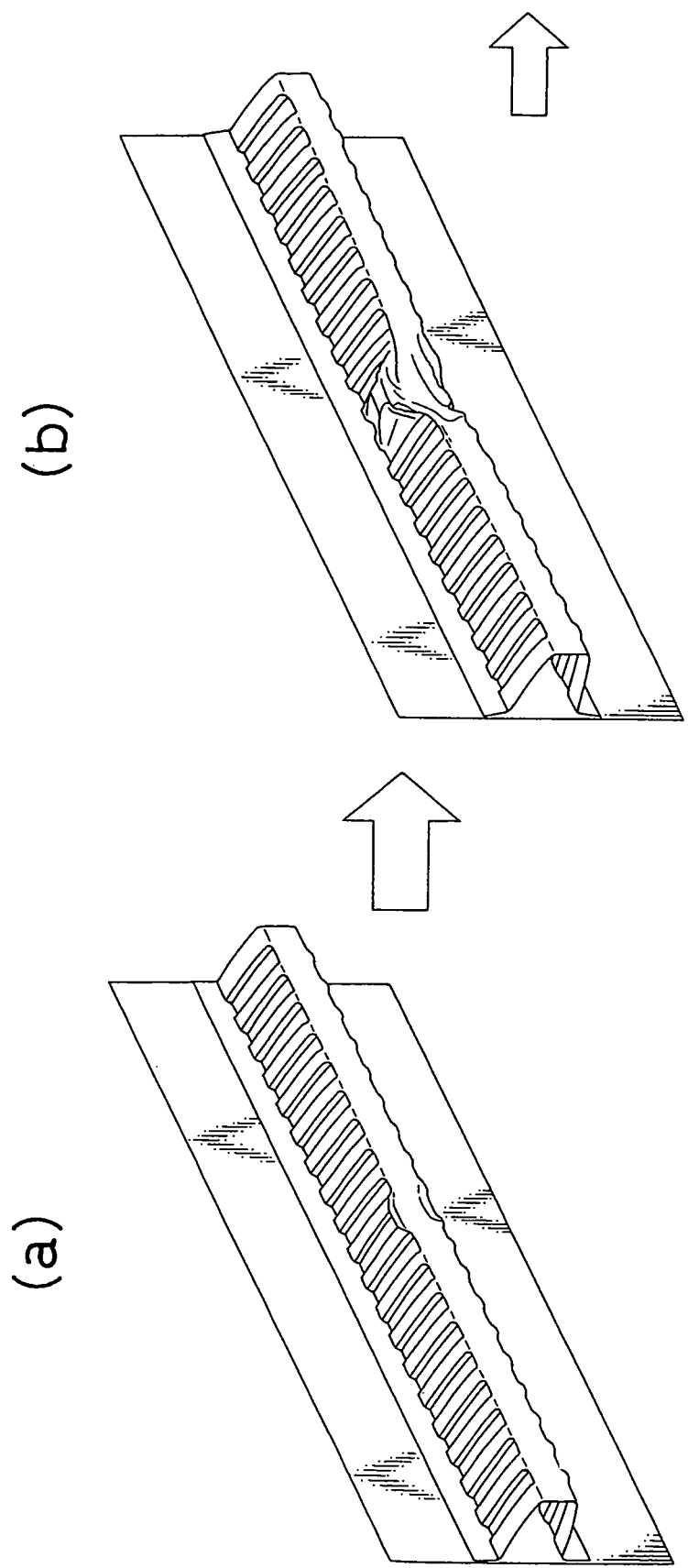
FIG. 7 are views showing deformation of the metal absorber of the present invention, in which (a) shows an initial period of collision and (b) shows a middle period of collision.
Figure 8:
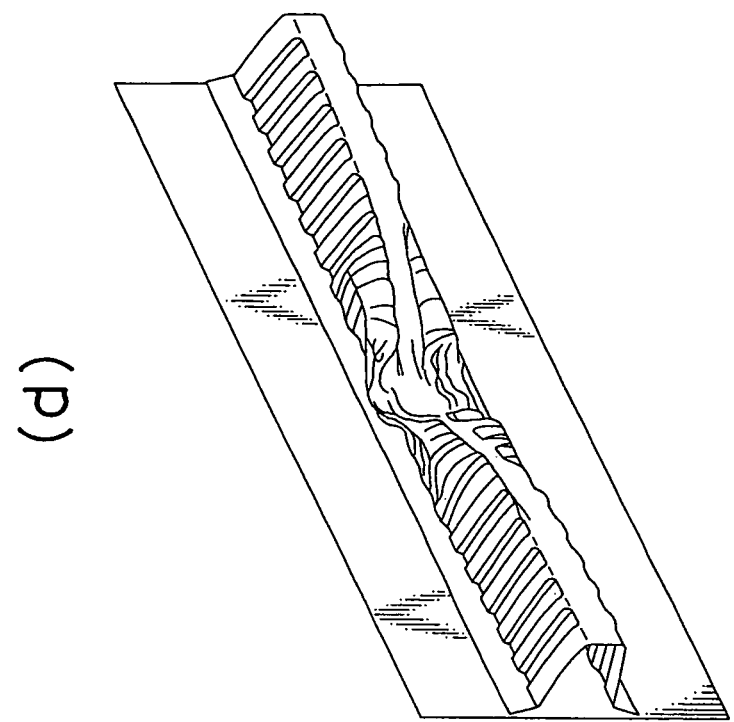
FIG. 8 are views showing the deformation of a metal absorber of the present invention, in which, following FIG. 7, (c) shows a later period of collision and (d) shows an end period of collision.
Figure 8:
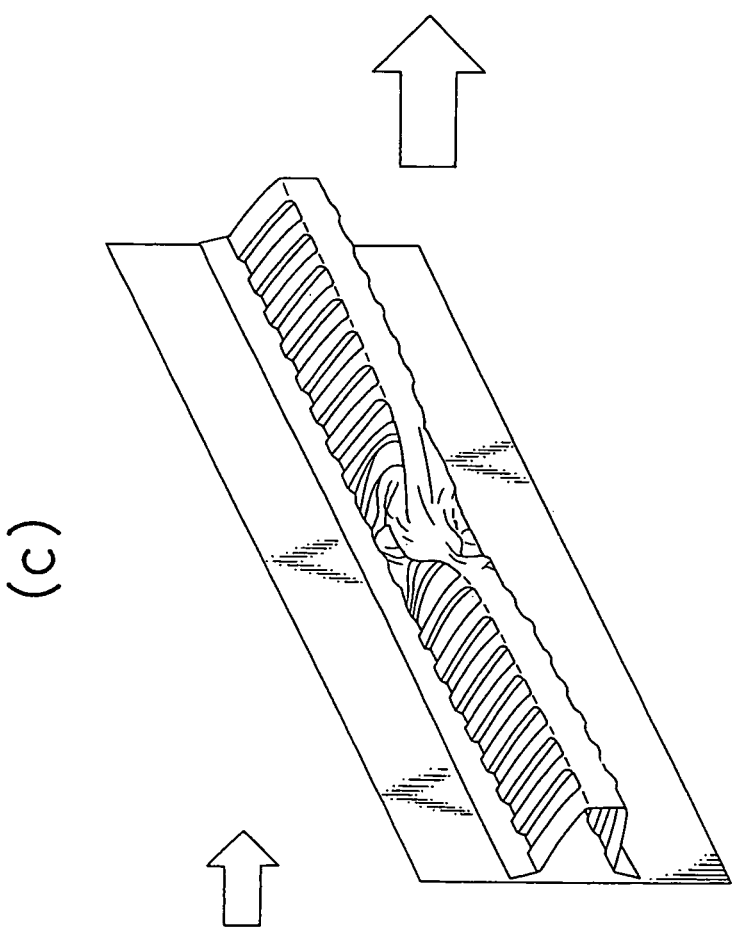

The result is shown in FIGS. 7 and 8. At the initial period of the collision (FIG. 7(*a*)), only the contact part locally is crushed and the force can be handled. In the intermediate period of the collision (FIG. 7(*b*)), the absorber folds outward from the bent parts and the member cross-section as a whole starts to buckle. Furthermore, in the latter period of the collision where deformation has considerably progressed (FIG. 8(*c*)), the adjoining beads successively are crushed. The force is handled by the crushing of the beads. In the end period of the collision (FIG. 8(*d*)), deformation of the member ends with no residual crush. Even if the vehicle collides at a speed of 40 km/hr, the force acting on the impactor can be maintained large (10 kN or more) and stroke of the impactor can be kept to 50 mm or less.

That is, in FIG. 6, the explanation was given by the example of the top web and bottom web having recessed beads substantially parallel to the front-back direction of the chassis, but as shown in FIG. 2, by providing one or both of the top web 0204 and the bottom web 0205 with recessed beads 7-1 or projecting beads 7-2 substantially parallel with the front-back direction of the chassis (see FIG. 10) over the entire surfaces, no matter where at the front surface of the vehicle a vehicle and a pedestrian collide, the beads buckle. Even with an absorber made of a metal sheet with a small sheet thickness, even in the case of collision at a speed of 40 km/hr, a larger impact energy can be absorbed by a small stroke of 50 mm or less, the absorber can be made lighter, and the leg of the pedestrian can be protected.

Figure 9:
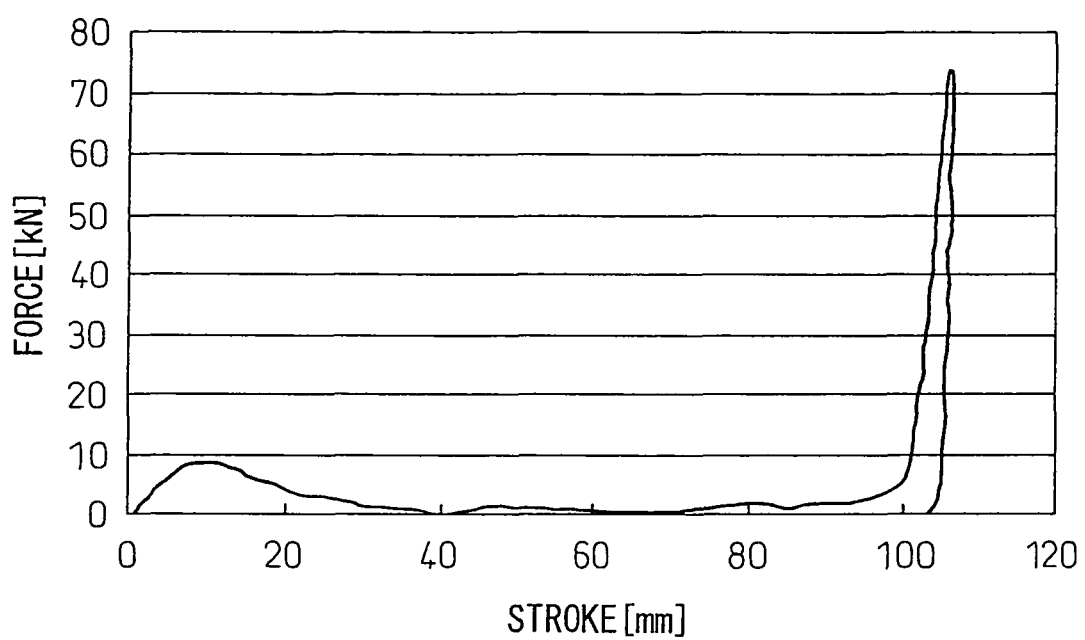
FIG. 9 is a view showing a collision test of a plastic absorber and leg impactor.

The above actions and effects cannot be obtained with plastic. In the case of a plastic (polyester polycarbonate) member of the same shape as FIG. 6 (however, thickness for securing rigidity: 2 mm), as shown by the force-stroke curve in FIG. 9, a force of about 10 kN is obtained at the initial period of the collision, but due to buckling and breakage of the plastic member, the force rapidly falls. The force continues low up to near an impactor stroke of 100 mm. Finally, the impactor strikes the back surface of the plastic member (bumper reinforcement) resulting in a large force. That is, with a plastic member, the impact energy cannot be absorbed by a small impactor stroke, so the leg of the pedestrian cannot be protected. Further, an increase of the member cross-sectional dimension and an increase in the member sheet thickness to absorb the impact energy would have an effect on the aesthetic design of the vehicle and increase the weight of the member.

Therefore, the automobile bumper absorber of the present invention is made using steel sheet, aluminum, titanium, or another metal. By this, it is possible to absorb the impact energy along with plastic deformation of the metal, so the invention is limited to a metal.

Figure 10:
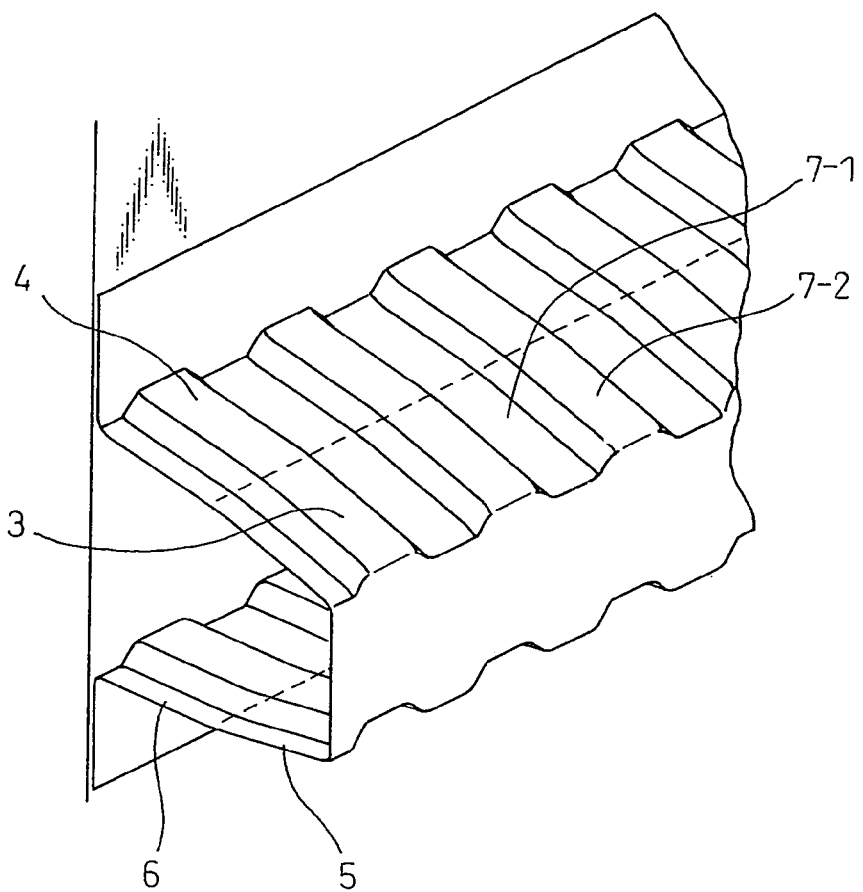
FIG. 10 is a detailed view of a metal absorber.
Figure 11:
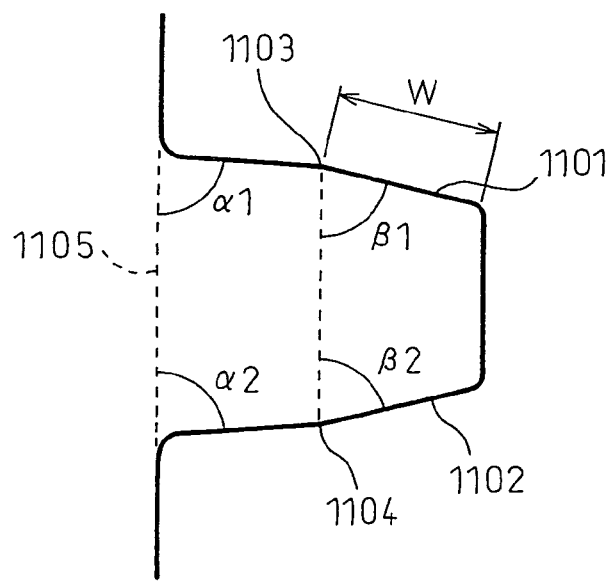
FIG. 11 is a cross-sectional view of a metal absorber of another invention example.

In the aspect of the present invention according to (2), the angles $\alpha_1$ and $\alpha_2$ of one or both of the top web and bottom web of the metal absorber are changed in the middle. The angles are changed, as shown in FIG. 10, so that the web projects out in the middle. That is, as shown in FIG. 11, one or both of the top web 1101 and bottom web 1102 have bent parts 1103, 1104 in the middle. The internal angle $\beta_1$ formed by the bent part 1103 of the top web 1101 with the plane parallel to the flange plane 1105 is made over 0 degree to less than $\alpha_1$ degrees, while the internal angle $\beta_2$ formed by the bent part 1104 of the bottom web 1102 with the plane parallel to the flange plane is made over 0 degree to less than $\alpha_2$ degrees.

To absorb impact energy by plastic deformation, the internal angle $\beta_1$ of the bent part 1103 of the top web and the internal angle $\beta_2$ of the bent part 1104 of the bottom web are preferably made over 0 degree, more preferably at least 45 degrees and still more preferably at least 60 degrees.

This is because when $\beta_1$ and $\beta_2$ are less than 45 degrees, the top web and the bottom web end up collapsing at the cross-sections of the members without plastic deformation. On the other hand, if $\beta_1$ and $\beta_2$ become $\alpha_1$ and $\alpha_2$ or more, the top web and bottom web fold inward toward the inside of the member starting at the bent parts and residual crush occurs, so less than $\alpha_1$ and less than $\alpha_2$ are preferable.

That is, the top web and the bottom web are preferably provided with bent parts at their middle parts so as to project outward.

By adopting such a structure, it becomes possible to stably secure a mode of deformation where the top and bottom surfaces fold outward, so the residual crush becomes smaller, it is possible to absorb the impact while maintaining the force acting on the impactor large (10 kN or more) even in the case of collision at a speed of 40 km/hr, and the stroke of the impactor can be made 50 mm or less, so the absorber can be made more compact.

The aspect of the present invention according to (3) defines the width of the bead as H/5 to H/2.5 mm, the pitch as H/2.5 to H/1.25 mm, and the depth as H/50 to H/10 mm, where the front-back direction dimension of the absorber is H mm. If the width of the bead is smaller than H/5 mm, the cost of fabrication of the absorber deteriorates, while if over H/2.5 mm, when the collision position between the leg of the pedestrian and the absorber changes, the damage to the pedestrian's leg varies, so the width of the bead is preferably made H/5 to H/2.5 mm.

Further, if the pitch of the bead is smaller than H/2.5 mm, the cost of fabrication of the absorber deteriorates, while if over H/1.25 mm, when the collision position between the leg of the pedestrian and the absorber changes, the damage to the pedestrian's leg varies, so the pitch of the bead is preferably made H/2.5 to H/1.25 mm.

Further, if the depth of the bead is less than H/50 mm, the impact energy at the time of collision cannot be sufficiently absorbed. If over H/10 mm, the strength of the absorber becomes too high and the damage to the pedestrian's leg becomes larger, so the depth of the bead is preferably made H/50 to H/10 mm.

The aspect of the present invention according to (4) is characterized by the arrangements of the beads at the top and bottom surfaces being offset by L/4 to L/2 mm at the top and bottom, where the pitch of the bead is L mm.

FIG. 10 shows an example of offset by L/2 mm. If the offset of the bead arrangement is smaller than L/4 mm at the top and bottom, the damage to the pedestrian's leg varies when the collision position of the pedestrian's leg and absorber changes. Further, if over L/2 mm, similarly the damage to the pedestrian's leg varies when the collision position of the pedestrian's leg and absorber changes, so the length of offset of the bead arrangements at the top and bottom is preferably made L/4 to L/2 mm.

The aspect of the present invention according to (5) is characterized by satisfying H/3≦W≦H/1.5 mm where the maximum width of the top web 1101 and bottom web 1102 is W mm (see FIG. 11).

In the same way as a hat-shaped cross-sectional shape with no bent parts, the top or bottom web ends up buckling at a location close to the top or bottom flange and the force can no longer be maintained, so the maximum width W is preferably made at least H/3 mm. On the other hand, if the maximum width W exceeds H/1.5 mm, the location of the top or bottom web close to the center flange buckles and the force can no longer be maintained, so the above range is preferable.

Figure 12:
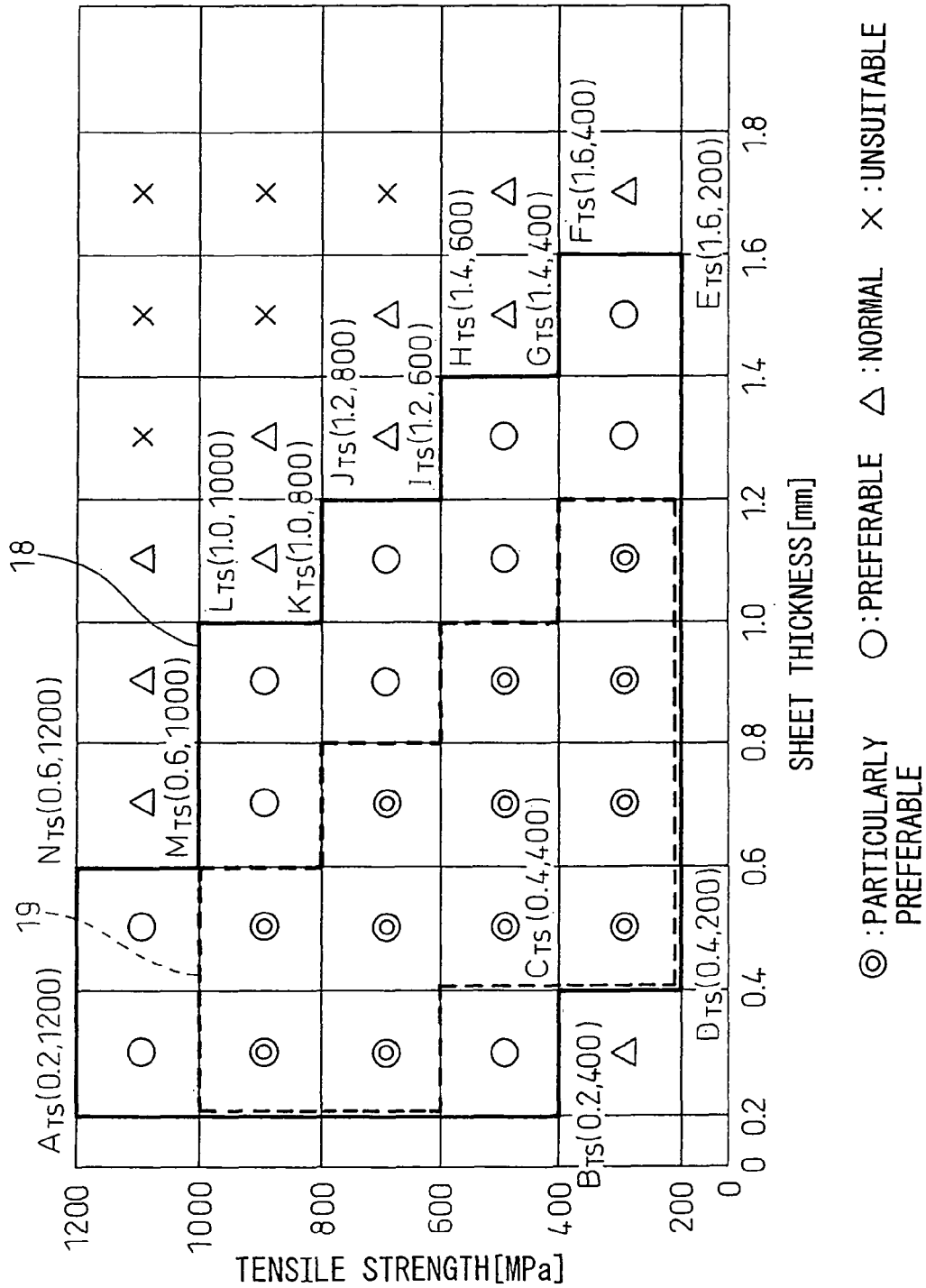
FIG. 12 is a view showing the range of tensile strength and sheet thickness of a material.

The aspect of the present invention according to (6) is characterized by the tensile strength and sheet of the material satisfying the range of the solid line in FIG. 12.

If the tensile strength and sheet thickness are in the bottom left region offset from the range shown by the solid line of FIG. 12, the strength of the absorber is too low, so the impact can no longer be absorbed. If in the top right region, the strength of the absorber is too high, so the damage inflicted on the pedestrian's leg becomes larger. Therefore, the tensile strength and sheet thickness of the material of the absorber preferably satisfy the range of the solid line of FIG. 12.

Furthermore, the strength of the absorber may vary due to variations in the dimensions at the time of producing and working the material, so the range of the tensile strength and sheet thickness of the material is particularly preferably set within the range of the broken line 19 of FIG. 12.

"Within the range of the broken line 19" means within the range obtained by connecting the (x,y) points (0.2,1000), (0.2,600), (0.4,600), (0.4,200), (1.2,200), (1.2,400), (1.0,400), (1.0,600), (0.8,600), (0.8,800), (0.6,800), (0.6,1000), and (0.2,1000) by lines in an x-y orthogonal coordinate system having the tensile strength as the y-axis and the sheet thickness as the x-axis.

Further, by making the material of the absorber a steel sheet, it is possible to inexpensively and efficiently realize energy absorption by plastic deformation accompanying elongation.

Figure 13:
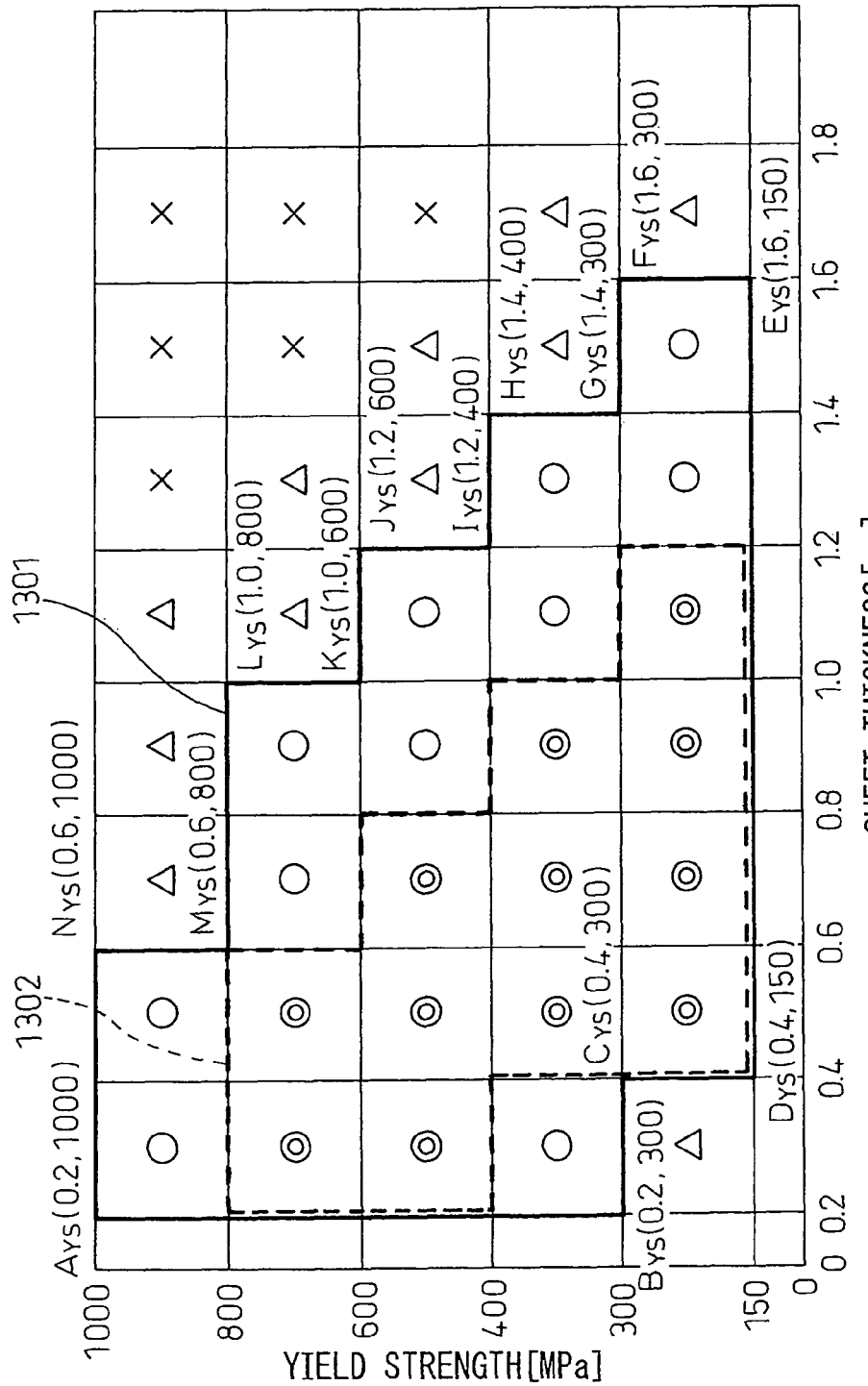
FIG. 13 is a view showing the range of yield strength and sheet thickness of a material.

The aspect of the present invention according to (7) is characterized in that the yield strength and sheet thickness of the material satisfy the range of the solid line 1301 of FIG. 13, particularly preferably satisfy the range of the broken line 1302 of FIG. 13. The plastic deformation of a material depends on the yield strength, so the deformation is defined in relation to the yield strength. The detailed explanation is the same as with the aspect of the invention according to (6), so is omitted.

The aspect of the invention according to (8) features the fact that $\alpha_1=\alpha_2$. To ensure that when the impactor collides, the top web and bottom web similarly plastically deform, the member as a whole deforms symmetrically vertically, and the force is maintained and the impact energy is absorbed efficiently, the difference between $\alpha_1$ and $\alpha_2$ is preferably made 5 degrees or less. For the same reason, particularly preferably $\alpha_1=\alpha_2$.

The aspect of the invention according to (9) is characterized by setting the upper limits of $\beta_1$ and $\beta_2$ to $\alpha_1-5$ degrees and $\alpha_2-5$ degrees respectively, and setting the lower limits of $\beta_1$ and $\beta_2$ to $\alpha_1-30$ degrees and $\alpha_2-30$ degrees respectively.

If the upper limit of $\beta_1$ is $\alpha_1-5$ degrees or less and the upper limit of $\beta_2$ is $\alpha_2-5$ degrees or less, the mode of deformation becomes one where the top and bottom surfaces of the member stably fold outward starting from the bent parts, so this is preferable. Further, if the lower limit of $\beta_1$ is $\alpha_1-30$ degrees or more and the lower limit of $\beta_2$ is $\alpha_2-30$ degrees or more, the top web and bottom web suitably plastically deform and the collapse of the member cross-section can be prevented, so this is preferable.

The aspect of the invention according to (10) is characterized by $\beta_1=\beta_2$. The top web 1101 and the bottom web 1102 are provided with bent parts.

To ensure that when the impactor collides, the top web and bottom web similarly plastically deform, the member as a whole deforms symmetrically vertically, and the force is maintained and the impact energy is absorbed efficiently, the difference between $\beta_1$ and $\beta_2$ is preferably 5 degrees or less. For the same reason, particularly preferably $\beta_1=\beta_2$.

Figure 14:
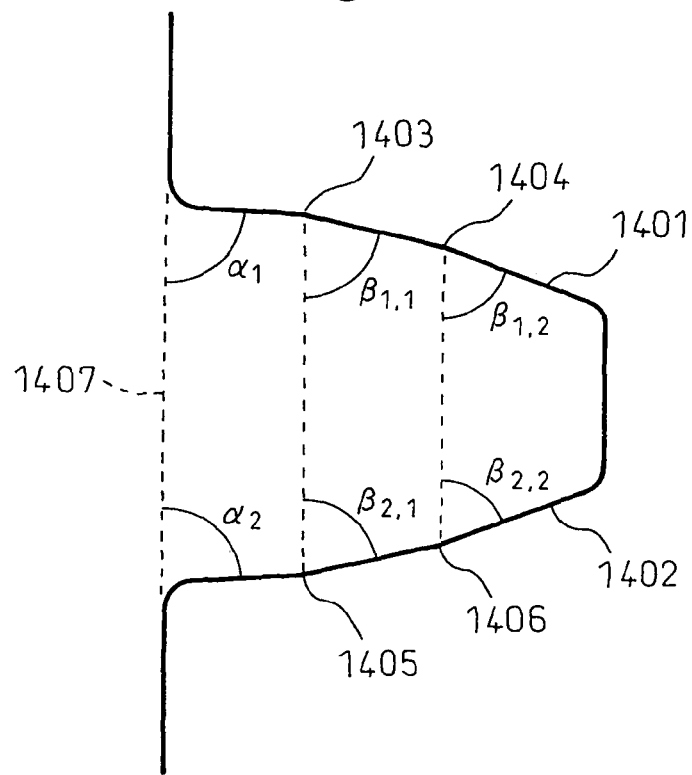
FIG. 14 is a cross-sectional view of a metal absorber of another invention example.

The aspect of the invention according to (11) is characterized in that, as shown in FIG. 14, one or both of the top web 1401 and bottom web 1402 are provided with a plurality of bent parts (projecting parts) 1403, 1404, 1405, and 1406 in the front-back direction, the internal angle $\beta_{1,n}$ formed by the plurality of bent parts 1403, 1404 of the top web 1401 with a plane parallel to the flange plane 1407 and the internal angle formed by the plurality of bent parts 1405, 1406 of the bottom web 1402 with a plane parallel to the flange plane satisfy $0<\beta_{1,n}<\beta_{1,n-1}<\alpha_1$ degrees, and the internal angle $\beta_{2,n}$ formed by the bent part of the bottom web and the plane parallel to the flange plane satisfies $0<\beta_{2,n}<\beta_{2,n-1}<\alpha_2$ degrees, where n=2, ..., N (N is an integer and is 1, 2, ... N-th in the order from close to the top flange or bottom flange).

To absorb the impact energy by plastic deformation, the internal angle $\beta_{1,n}$ of the bent part 1404 of the top web and the internal angle $\beta_{2,n}$ of the bent part 1406 of the bottom web are preferably made larger than 0 degree. On the other hand, to enable the projecting die tool and recessed die tool to engage when press forming the member, $\beta_{1,n}$ and $\beta_{2,n}$ must be made smaller than the internal angles $\beta_{1,n-1}$ and $\beta_{2,n-1}$ of the bent parts near the adjoining top flange or bottom flange, that is, near the flange plane 1407.

Further, to stably obtain a mode of deformation where the top web and bottom web fold outward starting from the plurality of bent parts of the top web and the plurality of bent parts of the bottom part at the time of collision by the impactor, the internal angles $\beta_{1,n-1}$ and $\beta_{2,n-1}$ are preferably smaller than $\alpha_1$ and $\alpha_2$.

That is, if providing the pluralities of bent parts so that the top web and bottom web project out, the effect is obtained that a mode of deformation where the top and bottom surfaces of the member stably fold outward is secured and the impact energy can be efficiently absorbed without residual crush.

The aspect of the invention according to (12) is the aspect of the invention according to (11) characterized in that $\beta_{1,n}=\beta_{2,n}$. To ensure that when the impactor collides, the top web and bottom web similarly plastically deform, the member as a whole deforms symmetrically vertically, and the force is maintained and the impact energy is absorbed efficiently, the difference between $\beta_{1,n}$ and $\beta_{2,n}$ is preferably 5 degrees or less. For the same reason, particularly preferably $\beta_{1,n}=\beta_{2,n}$.

The aspect of the invention according to (13) is characterized by providing a bent part in the region of 0.3H to 0.7H mm from the top flange or the bottom flange in the front-back direction of the chassis, where the front-back direction dimension of the absorber is H mm.

If providing one or both of the top web and bottom web with a bent part, to prevent the top web and bottom web from buckling at positions near the center flange, it is preferable to provide the bent part at a region of 0.3H mm or more from the top flange or the bottom flange in the front-back direction of the chassis (toward the center flange). On the other hand, if the position of provision of the bent part exceeds 0.7H mm from the top flange or bottom flange in the front-back direction of the chassis (toward the center flange), the top web and bottom web buckle at positions near the top flange and bottom flange and the member cross-section as a whole collapses, so it is preferable to provide the bent part in the above range.

The aspect of the invention according to (14) is characterized in that the vehicular metal bumper is an automobile metal bumper.

By making this an automobile bumper, it is possible to absorb impact when colliding at a speed of 40 km/hr (10 kN or more) and possible to make the stroke of the impactor 50 mm or less, so this is preferable for protection of the leg of a pedestrian.

The aspect of the invention according to (15) is characterized in that when making an impactor having a diameter of 70 mm, a length of 200 mm, and a mass of 8 kg collide with the absorber according to the aspects of the invention of the above (1) to (14) at an initial speed of 40 km/hr, the maximum force acting on the impactor is 2 kN to 12 kN, the force acting on the impactor is substantially constant, and the front-back direction dimension of the absorber required until the impactor stops is 50 mm or less.

By providing one or both of the top web and bottom web with a recessed or projecting bead substantially parallel to the front-back direction of the vehicle, the maximum force acting on the impactor becomes 2 kN to 12 kN and an absorber preferable for protection of pedestrians can be obtained.

Further, the force acting on the impactor becomes substantially uniform, so the effects can be obtained that the impact energy can be efficiently absorbed by a compact member and the member can be made light in weight.

Further, by making the front-back direction dimension of the absorber required for the impactor to stop 50 mm, even if a pedestrian is collided with at a speed of 40 km/hr, the pedestrian's leg can be prevented from being broken and the damage given to the pedestrian's legs can be kept to a minimum.

The aspect of the present invention according to (16) is an automobile bumper system providing a fascia and reinforcement before and after the automobile bumper absorber as set forth in any one of the above (1) to (5).

The fascia and reinforcement are not particularly limited. Known parts may be used. By providing the automobile bumper absorber of the present invention, when the automobile and pedestrian collide with each other at a speed of 40 km/hr, the bead part preferentially buckles and absorbs the impact energy, so the pedestrian's leg can be protected.

Next, the aspect of the present invention according to (17) will be concretely explained.

As shown by the outline when attaching an automobile bumper absorber of the present invention to a reinforcement in FIG. 1, the metal absorber 1 according to the present invention has a length of the amount of the chassis width direction and is provided between a bumper fascia arranged at the front (not shown) and a reinforcement 2 arranged at the rear.

The metal absorber forms an approximately hat shape obtained by press forming steel sheet. The opening part is provided to flare outward toward the rear direction of the chassis. "Toward the rear direction of the chassis" means, with respect to the bumper fascia arranged at the front side, toward the chassis direction at the opposite side to the bumper fascia. Therefore, even when attached to the rear bumper, the opening part is provided flaring outward toward the chassis direction at the opposite side to the bumper fascia.

By making the absorber a metal and by making it flare outward, overall buckling easily occurs preferentially, so the impact energy can be absorbed without giving serious damage to the leg of the pedestrian.

Further, as shown in FIG. 10, by providing the recessed bead 7-1 or projecting bead 7-2 substantially parallel to the front-back direction of the chassis at the top and bottom surfaces as a whole, even if an automobile and pedestrian collide with each other at some location of the front surface of the automobile, the beads will buckle, so even an absorber using a metal sheet with a small sheet thickness will be able to absorb greater impact energy, the absorber can be lightened in weight, and the pedestrian's leg can be protected.

By making the automobile bumper absorber according to the present invention out of steel sheet, aluminum, titanium, or another metal, it is possible to absorb the impact energy accompanying the plastic deformation of the metal, so the invention is limited to a metal.

The aspect of the present invention according to (18) is characterized in that the flaring angle of the top and bottom surfaces of the metal absorber changes in the middle. The angle is made to change so that, as shown in FIG. 1 and FIG. 10, projections (peaks) are formed in the middle.

By using such a structure, a mode of deformation where the top and bottom surfaces fold outward is stably secured, so there is little residual crush and the absorber can be made compact.

The aspect of the present invention according to (19) defines the width of the bead as H/5 to H/2.5 mm, the pitch as H/2.5 to H/1.25 mm, and the depth as H/50 to H/10 mm when the front-back direction dimension of the absorber is H mm). The detailed explanation is the same as with the aspect of the invention according to (3), so is omitted.

The aspect of the present invention according to (20) is characterized by the arrangements of the beads at the top and bottom surfaces being offset by L/4 to L/2 mm above and below, where the pitch of the bead is L mm. The detailed explanation is the same as with the aspect of the invention according to (4), so is omitted.

The aspect of the present invention according to (21) is characterized by the tensile strength and sheet thickness of the material satisfying the range of the solid line of FIG. 12. The detailed explanation is the same as with the aspect of the invention according to (6), so is omitted.

The aspect of the present invention according to (22) is an automobile bumper system providing a fascia and reinforcement before and after the automobile bumper absorber as set forth in any one of the above (17) to (21). The detailed explanation is the same as with the aspect of the invention according to (16), so is omitted.

Next, the method of production of an absorber of the present invention will be explained.

Figure 15:
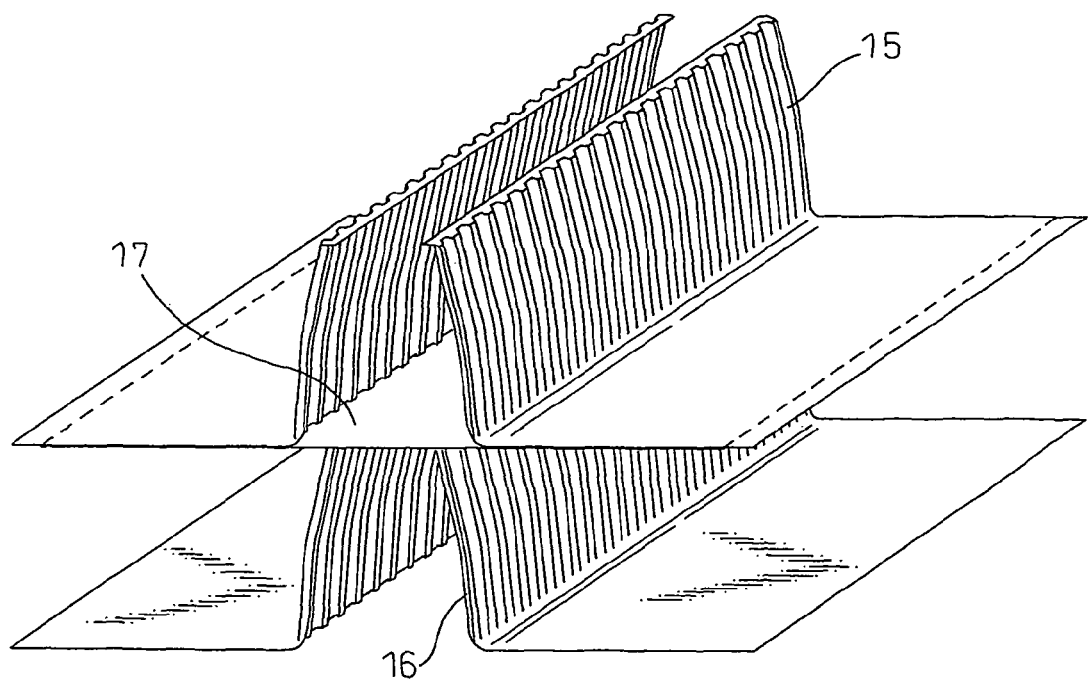
FIG. 15 is a view showing a method of production of a metal absorber.

As shown in FIG. 15, recessed and projecting die tools 15, 16 were used to press form the metal sheet 17 and transfer the die tool shape to the metal sheet to produce the absorber.

The die tools were fabricated by machining a steel material. In their surfaces, beads similar to the absorber shape of the present invention were cut. These die tools were attached to a bed and slide of a press machine, then a metal sheet 17 was placed between the recessed and projecting die tools 15, 16 and pressed from above and below. To secure formability by the shape and material of the absorber, sometimes a pad (not shown) is placed at the center part of the recessed die tool 15 and the front end of the absorber is pushed by a certain pressure.

EXAMPLES

Below, examples will be used to explain the present invention concretely.

Example 1

As the metal absorber of the Invention Example 1, one of the following material, working method, and shape was tested.

Material: steel sheet of a tensile strength of the 440 MPa class and a sheet thickness of 0.6 mm was used.

Forming method: A die tool shown in FIG. 15 was used to press the sheet into an approximately hat shape.

Shape

Top-bottom dimension (maximum width of the top web and bottom web): 45 mm,
Front-back dimension (front-back direction length of top web and bottom web): 50 mm,
Left-right dimension (vehicle width direction length): 500 mm,
Top flange and bottom flange length (one side): 20 mm,
Length of top flange and bottom flange from middle bent parts to center flange: 30 mm, Flaring angle of top web and bottom web toward rear of chassis
12.5 degrees with respect to horizontal plane from top web and bottom web (chassis front direction), that is, $\beta_1$: 77.5 degrees and $\beta_2$: 77.5 degrees,
After 25 mm in front-back direction, 5 degrees with respect to horizontal plane (chassis rear direction), that is, $\alpha_1$: 85 degrees and $\alpha_2$: 85 degrees,
Bead width: 12.5 mm,
Bead pitch (L): 25 mm,
Bead depth: 3 mm,
Bead arrangement: arranged offset by 12.5 mm (L/2) at top and bottom,
Bead orientation: ridgeline of bead arranged ±2.9 degrees with respect to front-back direction of chassis when projected on horizontal plane Further, as a Comparative Example 1, a solid plastic absorber using plastic foam (polypropylene) (top-bottom dimension of 90 mm, front-back dimension of 90 mm, and left-right dimension of 500 mm) was tested. Except for providing the top web and bottom web with bent parts at positions of 45 mm in the front-back direction and making the top-bottom dimension, front-back dimension, and left-right direction the above values, the dimensions were made the same as the above invention example.

Figure 16:
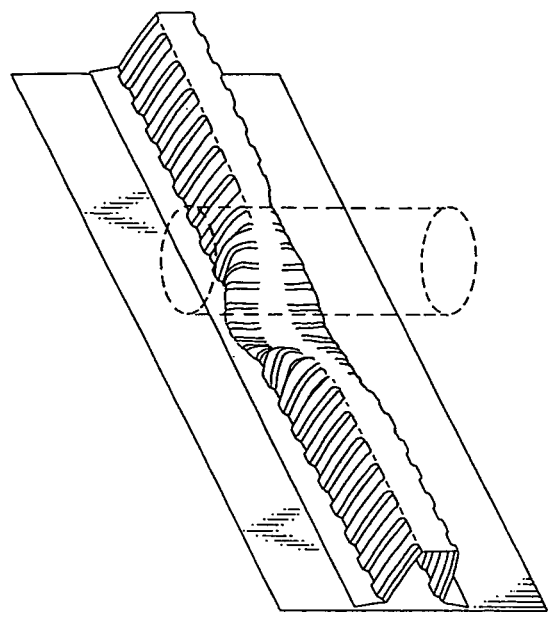
FIG. 16 is a view showing a collision test between an absorber of the present invention and a leg impactor.
Figure 16:
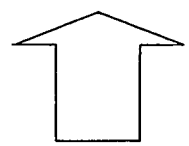
Figure 16:
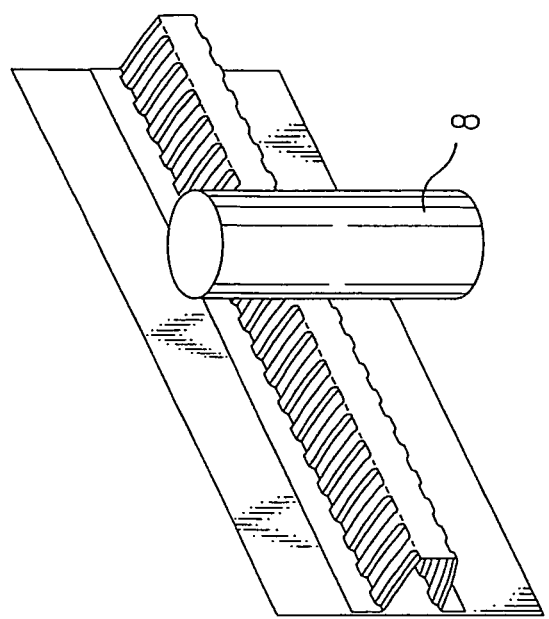

As the performance evaluation, the impact was analyzed by numerical analysis using the finite element method. As shown in FIG. 16, an impactor 8 simulating a pedestrian leg (diameter of 70 mm, length of 200 mm, and mass of 8 kg) was made to collide with the absorber at an initial speed of 40 km/hr and the trends in the force acting on the impactor at the time of collision (force-stroke relationship) and the state of deformation of the absorber were confirmed.

Figure 17:
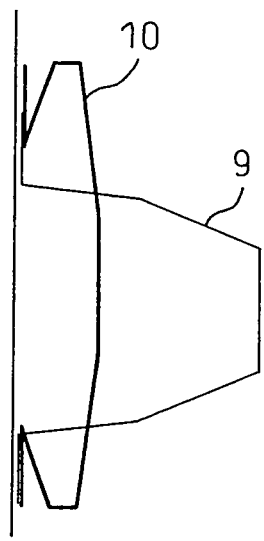
FIG. 17 is a view showing deformation of a metal absorber (center cross-section of length of ½ of left-right direction).
Figure 18:
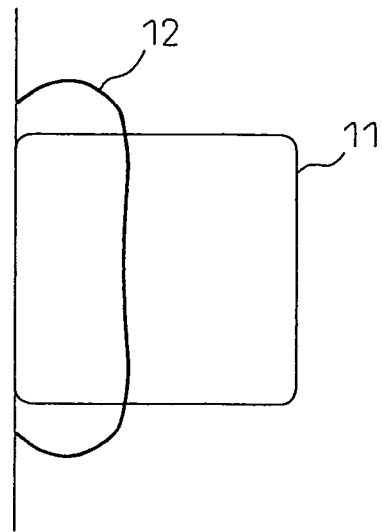
FIG. 18 is a view showing deformation of a plastic absorber (center cross-section of ½ length of left-right direction).
Figure 19:
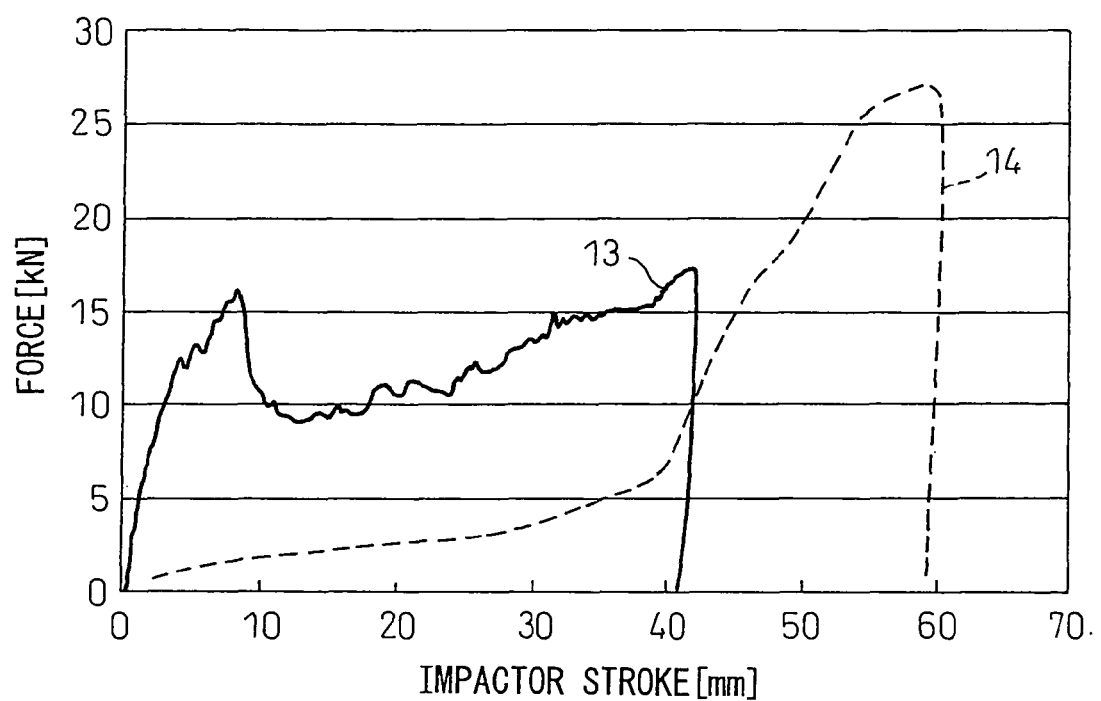
FIG. 19 is a view of the relationship between a force and stroke at the time of a collision.

FIG. 17 and FIG. 18 show the states of metal and plastic absorbers after deformation. The metal absorber is crushed to become broader in the vertical direction and has little residual crush (FIG. 17). As opposed to this, as shown in FIG. 18, in a plastic absorber, the plastic material cannot flow out compared with the initial shape 11 even after collision and has large residual crush (see deformed shape 12 of FIG. 18). FIG. 19 shows the force-stroke relationship at the time of collision. The metal absorber absorbs the impact by a short stroke (see FIG. 19, line 13), while the plastic absorber requires a long stroke for impact absorption (see FIG. 19, line 14).

Example 2

As the metal absorber of the Invention Example 2, one of the following material, working method, and shape was tested.

Material: steel sheet of a tensile strength of the 590 MPa class and a sheet thickness of 0.6 mm was used.
Forming method: Pressed to an approximately hat shape.
Shape
Top-bottom dimension (maximum width of the top web and bottom web): 45 mm,
Front-back dimension (front-back direction length of top web and bottom web): 50 mm,
Left-right dimension (vehicle width direction length): 500 mm,
Top flange and bottom flange length (one side): 20 mm,
Flare angle of top web and bottom web toward rear of chassis
5 degrees with respect to horizontal plane from top web and bottom web, that is, $\alpha_1$: 85 degrees and $\alpha_2$: 85 degrees,
Bead width: 25 mm,
Bead pitch (L): 50 mm,
Bead depth: 3 mm.

As the performance evaluation, the impact was analyzed by numerical analysis using the finite element method. In the same way as in Example 1, an impactor 8 simulating a pedestrian leg (diameter of 70 mm, length of 200 mm, and mass of 8 kg) was made to collide with the absorber at an initial speed of 40 km/hr and the trends in the force acting on the impactor at the time of collision (force-stroke relationship) and the state of deformation of the absorber were confirmed.

Figure 20:
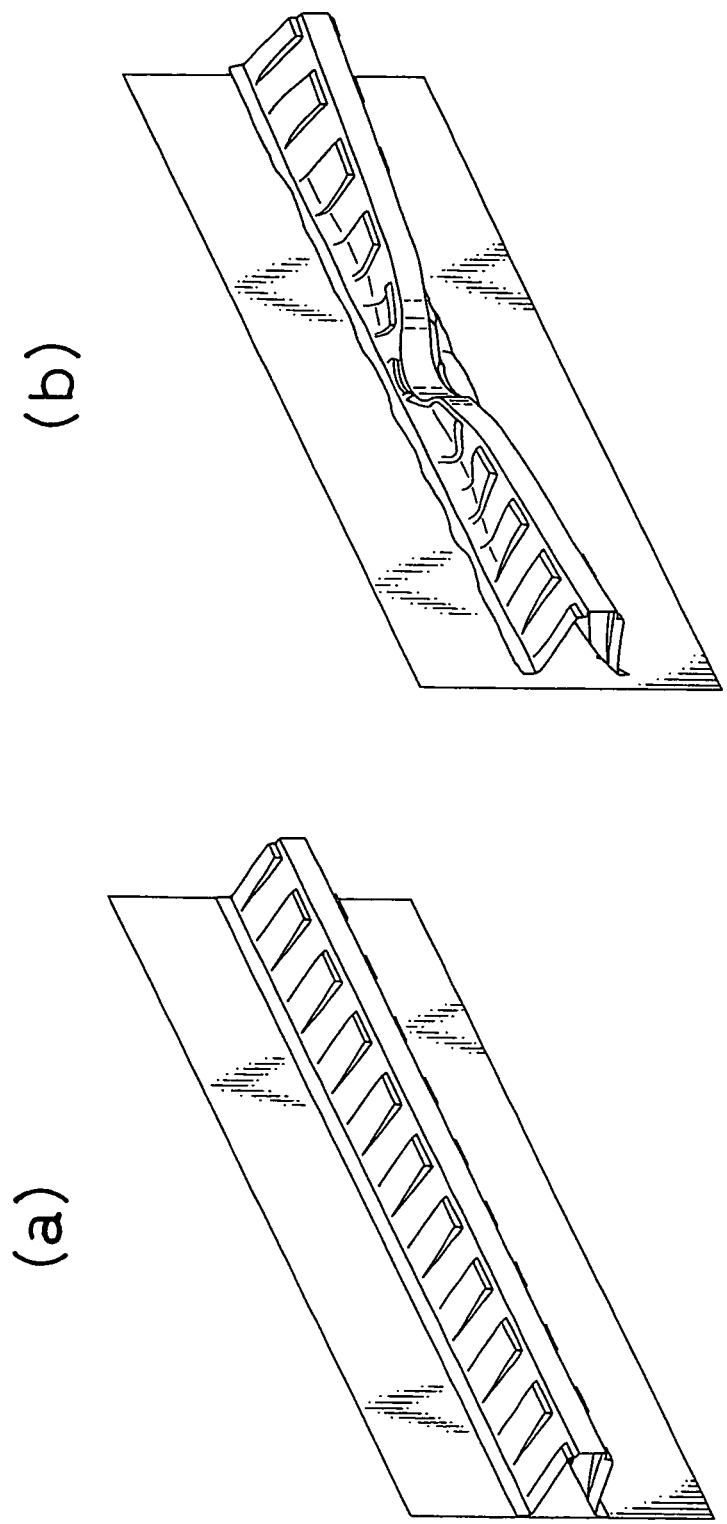
FIG. 20 are views showing deformation of an absorber with no bent parts at the top web and bottom web, wherein (a) shows a state before collision and (b) shows a state after collision.
Figure 21:
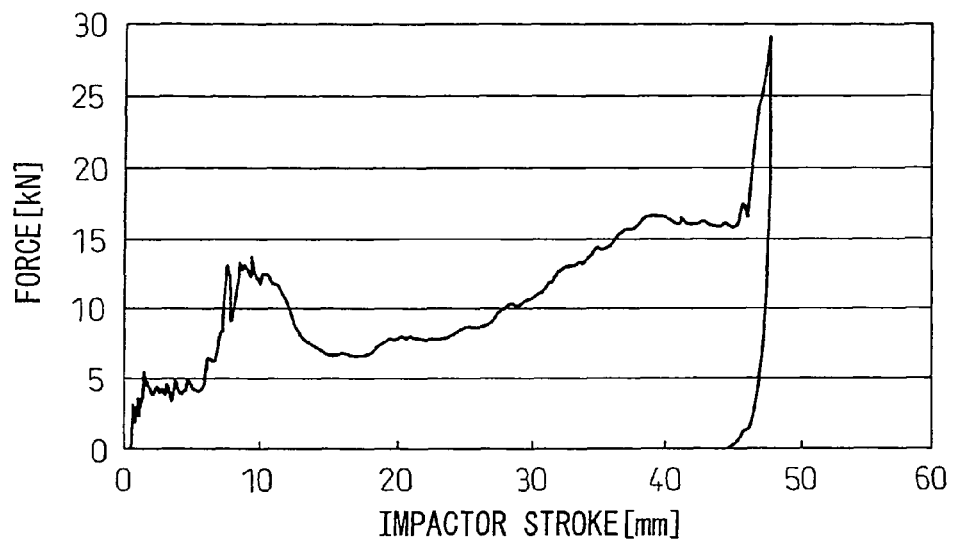
FIG. 21 is a view of the relationship between a force and stroke at the time of a collision of an absorber with no bent parts at the top web and bottom web.

FIG. 20(*b*) shows the state of the absorber after deformation. The absorber was crushed with the top web is folded downward and the bottom web folded upward. FIG. 21 shows the force-stroke relationship at the time of collision. At the stage of the initial period of collision, the force rapidly rose, then immediately fell. After that, the force gradually continued to rise. In the latter period of the collision, a large force was generated and the impact energy was absorbed. In this example, the top and bottom flanges folded inward, so residual crush occurred and the force rose and fell. However, compared with a plastic absorber (see FIG. 19), the force which the impactor absorbed increased, the front-back direction dimension of the absorber required until the impactor stopped could be made 50 mm or less, and the absorber could be confirmed effective to a certain extent for absorption of impact energy. With the metal absorber alone, the target maximum force is liable to be exceeded and the pedestrian's leg to be damaged, but if jointly using an elastic member or other buffer member, pedestrian protection can also be realized.

Example 3

Below, an example will be used to explain the present invention concretely.

As the metal absorber of the Invention Example 3(a), one of the following material, working method, and shape was tested.

Material: steel sheet of a tensile strength of the 440 MPa class and a sheet thickness of 0.7 mm was used.

Forming method: A die tool shown in FIG. 15 was used to press the sheet into an approximately hat shape shown in FIG. 22(*a*).

Figure 22:
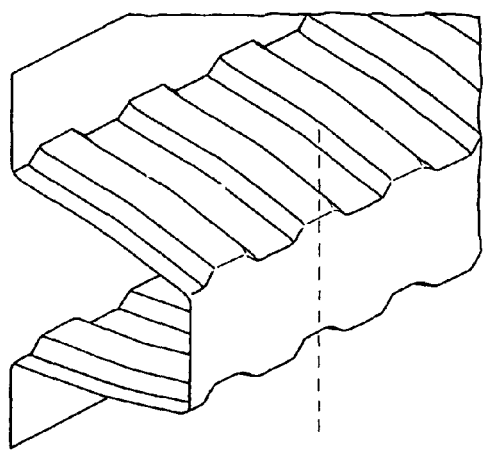
FIG. 22 are views for explaining arrangements of beads, wherein (a) is a view showing an absorber arranging beads of the top web and bottom web offset by half a wavelength so that projecting beads and recessed beads do not face each other.
Figure 22:
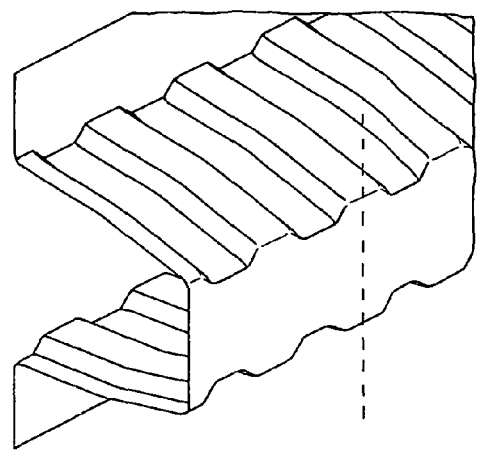

Shape
Top-bottom dimension (maximum width of the top web and bottom web): 45 mm,
Front-back dimension (front-back direction length of top web and bottom web): 50 mm,
Left-right dimension (vehicle width direction length): 500 mm,
Top flange and bottom flange length (one side): 20 mm,
Length of top flange and bottom flange from middle bent parts to center flange: 25 mm,
Flare angle of top web and bottom web toward rear of chassis
  12.5 degrees with respect to horizontal plane from top web and bottom web (chassis front direction), that is, $\beta_1$: 77.5 degrees and $\beta_2$: 77.5 degrees,
  After 25 mm in front-back direction, 5 degrees with respect to horizontal plane (chassis rear direction), that is, $\alpha_1$: 85 degrees and $\alpha_2$: 85 degrees,
Bead width: 12.5 mm,
Bead pitch (L): 25 mm,
Bead depth: 3 mm,
Bead arrangement: arranged offset by 12.5 mm (L/2) at top and bottom,
Bead orientation: ridgeline of bead arranged ±2.9 degrees with respect to front-back direction of chassis when projected on horizontal plane Further, as the Invention Example 3(b), as shown in FIG. 22(*b*), an absorber with the top web and bottom web arranged so that the projecting beads and recessed beads face each other was tested.

As the performance evaluation, the impact was analyzed by numerical analysis using the finite element method. In the same way as in FIG. 16, an impactor 8 simulating a pedestrian leg (diameter of 70 mm, length of 200 mm, and mass of 8 kg) was made to collide with the absorber at an initial speed of 40 km/hr and the trends in the force acting on the impactor at the time of collision (force-stroke relationship) and the state of deformation of the absorber were confirmed. At this time, the impactor collision position was made the bead center and bead boundary and the change in performance due to the impactor collision position was confirmed.

The absorbers of the Invention Example 3(a) and the Invention Example 3(b) both are crushed to become broader in the vertical direction and have little residual crush (not shown). FIG. 23 shows the relationship of the force and stroke at the time of collision. When there is offset between the top and bottom beads, similar force-stroke characteristics are exhibited regardless of the collision position (FIG. 23(*a*)), but when there is no offset between the top and bottom beads, the force at the initial period of the collision becomes extremely large when the bead center is impacted (see FIG. 23(*b*), line 2304). While the force-stroke characteristic varies depending on the collision position, compared with a plastic absorber (see FIG. 19, dotted line 14), the force which the impactor absorbs increases and further the front-back direction dimension of the absorber required until the impactor stops can be made 50 mm or less. The examples could be confirmed to be effective to a certain extent in absorbing impact energy and protecting the leg of the pedestrian.

INDUSTRIAL APPLICABILITY

According to the present invention, at the time of a collision between a pedestrian and an automobile, the hat-shaped metal absorber is crushed to spread in the vertical direction, whereby the impact energy received from the leg of the pedestrian is efficiently absorbed by a short stroke and residual crush becomes smaller, so the leg of the pedestrian can be protected by the smallest member dimension. Specifically, when colliding with a pedestrian at a speed of 40 km/hr, it is possible to absorb the impact energy by a stroke of 50 mm or less and protect the leg of the pedestrian.

The invention claimed is:

1. A long vehicular metal absorber comprising a center flange, a top web and a bottom web connected to the two sides of the center flange, a top flange connected to the top web, and a bottom flange connected to the bottom web and formed overall into a hat shaped cross-section, said vehicular metal absorber characterized in that in the hat-shaped cross-section, plane of said top flange and plane of said bottom flange fall on a same flange plane, an internal angle $\alpha_1$ formed by the top web with said flange plane and an internal angle $\alpha_2$ formed by the bottom web with said flange plane are respectively over 0 degree to less than 90 degrees, and a bent part is provided in the middle of one or both of the top web and bottom web, an internal angle $\beta_1$ formed by the bent part of the top web with the flange plane is over 0 degree to less than $\alpha_1$ degrees, and an internal angle $\beta_2$ formed by the bent part of the bottom web with the flange plane is over 0 degree to less than $\alpha_2$ degrees, wherein one or both of the top web and bottom web are provided with a recessed or projecting bead substantially parallel to a front-back direction of a vehicle and wherein the metal absorber is made of a steel sheet having a tensile strength (MPa) and sheet thickness (mm) which fall on a line obtained by successively connecting points $A_{TS}$ (0.2,1200), $B_{TS}$ (0.2,400), $C_{TS}$ (0.4,400), $D_{TS}$ (0.4,200), $E_{TS}$ (1.6,200), $F_{TS}$ (1.6,400), $G_{TS}$ (1.4,400), $H_{TS}$ (1.4,600), $I_{TS}$ (1.2,600), $J_{TS}$ (1.2,800), $K_{TS}$ (1.0,800), $L_{TS}$ (1.0,1000), $M_{TS}$ (0.6,1000), $N_{TS}$ (0.6,1200), and $A_{TS}$ (0.2,1200) of (x,y) coordinates in an x-y orthogonal coordinate system having the tensile strength as the y-axis and the sheet thickness as the x-axis or within the area encompassed by said line.

2. A long vehicular metal absorber, comprising a center flange, a top web and a bottom web connected to the two sides of the center flange, a top flange connected to the top web, and a bottom flange connected to the bottom web and formed overall into a hat shaped cross-section, said vehicular metal absorber characterized in that in the hat-shaped cross-section, plane of said top flange and plane of said bottom flange fall on a same flange plane, an internal angle $\alpha_1$ formed by the top web with said flange plane and an internal angle $\alpha_2$ formed by the bottom web with said flange plane are respectively over 0 degree to less than 90 degrees, and a bent part is provided in the middle of one or both of the top web and bottom web, an internal angle $\beta_1$ formed by the bent part of the top web with the flange plane is over 0 degree to less than $\alpha_1$ degrees, and an internal angle $\beta_2$ formed by the bent part of the bottom web with the flange plane is over 0 degree to less than $\alpha_2$ degrees, wherein one or both of the top web and bottom web are provided with a recessed or projecting bead substantially parallel to a front-back direction of a vehicle, and wherein the metal absorber is made of a steel sheet having a yield strength (MPa) and sheet thickness (mm) which fall on a line obtained by successively connecting points $A_{YS}$ (0.2,1000), $B_{YS}$ (0.2, 300), $C_{YS}$ (0.4,300), $D_{YS}$ (0.4,150), $E_{YS}$ (1.6,150), $F_{YS}$ (1.6, 300), $G_{YS}$ (1.4,300), $H_{YS}$ (1.4,400), $I_{YS}$ (1.2,400), $J_{YS}$ (1.2, 600), $K_{YS}$ (1.0,600), $L_{YS}$ (1.0,800), $M_{YS}$ (0.6,800), $N_{YS}$ (0.6, 1000), and $A_{YS}$ (0.2,1000) of (x,y) coordinates in an x-y orthogonal coordinate system having the yield strength as the y-axis and the sheet thickness as the x-axis or within the area encompassed by said line.

3. A vehicular metal absorber as set forth in claim 1, characterized in that when a front-back direction dimension of the absorber is H mm, the bead has a width of H/5 to H/2.5 mm, a pitch of H/2.5 to H/1.25 mm, and a depth of H/50 to H/10 mm.

4. A vehicular metal absorber as set forth in claim 1, characterized in that when the pitch of the beads is L mm, the arrangements of the beads at the top and bottom surface are offset by L/4 to L/2 mm above and below.

5. A vehicular metal absorber as set forth in claim 3, characterized in that, when the maximum width of the top web and bottom web is W mm, $H/3 \leq W \leq H/1.5$ mm is satisfied.

6. A vehicular metal absorber as set forth in claim 1, characterized in that $\alpha_1 = \alpha_2$.

7. A vehicular metal absorber as set forth in claim 2, characterized in that $\beta_1$ and $\beta_2$ respectively satisfy $\alpha_1 - 30 < \beta_1 < \alpha_1 - 5$ (degree) and $\alpha_2 - 30 < \beta_2 < \alpha_2 - 5$ (degree).

8. A vehicular metal absorber as set forth in claim 2, characterized in that $\beta_1 = \beta_2$.

9. A vehicular metal absorber as set forth in claim 1, characterized in that in the hat-shaped cross-section, one or both of the top web and bottom web have a plurality of bent parts, an internal angle $\beta_{1,n}$ formed by a bent part of said top web with the flange plane satisfies $0 < \beta_{1,n} < \beta_{1,n-1} < \alpha_1$ (degrees), and an internal angle $\beta_{2,n}$ of a bent part of said bottom web with the flange plane satisfies $0 < \beta_{2,n} < \beta^{2,n-1} < \alpha_2$ (degrees):

where, n=2, . . . , N (N is an integer and is 1, 2 . . . N in order from close to the top flange or bottom flange).

10. A vehicular metal absorber as set forth in claim 9 characterized in that $\beta_{1,n} = \beta_{2,n}$.

11. A vehicular metal absorber as set forth in claim 2, characterized in that when a front-back direction dimension (H) of the absorber is made H mm, a bent part is provided in a region satisfying 0.3H to 0.7H mm in the vehicle front-back direction from the top flange or bottom flange.

12. A vehicular metal absorber as set forth in claim 1, characterized in being for automobile bumper use.

13. A vehicular metal absorber as set forth in claim 1, characterized in that when making an impactor of a diameter of 70 mm, a length of 200 mm, and a mass of 8 kg impact an absorber as set forth in any one of claims 1 to 14 by an initial speed of 40 km/hr, a maximum force acting on the impactor is 2 kN to 12 kN, a force acting on the impactor is substantially constant, and a front-back direction dimension of the absorber necessary until the impactor stops is 50 mm or less.

14. A vehicular bumper system characterized by providing a fascia and reinforcement before and after a vehicular metal absorber as set forth in claim 1.

15. An automobile bumper absorber of a vehicle, comprising the long vehicular metal absorber of claim 1 or 2 provided between a fascia and reinforcement of an automobile bumper, the hat shape with the top and the bottom surface flaring out toward the rear direction of the vehicle.

16. An automobile bumper absorber as set forth in claim 15, characterized in that a flaring angle of the top and bottom surfaces changes in the middle of the front-back direction of the vehicle and the top and bottom surfaces have peak parts.

17. An automobile bumper absorber as set forth in claim 15, characterized in that when a front-back direction dimension of the absorber is H mm, the bead has a width of H/5 to H/2.5 mm, a pitch of H/2.5 to H/1.25 mm, and a depth of H/50 to H/10 mm.

18. An automobile bumper absorber as set forth in claim 15, characterized in that when the pitch of the bead is L mm, the arrangements of the beads at the top and bottom surface are offset by L/4 to L/2 mm above and below.

19. An automobile bumper absorber of a vehicle, comprising the long vehicular metal absorber as set forth in claim 2 provided between a fascia and reinforcement of an automobile bumper, the hat shape with the top and the bottom surface flaring out toward the rear direction of the vehicle, characterized in that a tensile strength and sheet thickness of the material fall on the solid line 18 of FIG. 12 or within the area encompassed by said line.

20. An automobile bumper system characterized by providing a fascia and reinforcement before and after an automobile bumper absorber as set forth in claim 15.

* * * * *

UNITED STATES PATENT AND TRADEMARK OFFICE
CERTIFICATE OF CORRECTION

PATENT NO.       : 8,419,090 B2
APPLICATION NO. : 12/450454
DATED            : April 16, 2013
INVENTOR(S)      : Nojima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 61 days.

Signed and Sealed this
First Day of September, 2015

Michelle K. Lee
*Director of the United States Patent and Trademark Office*